(12) United States Patent
Yokoyama

(10) Patent No.: US 6,864,906 B2
(45) Date of Patent: Mar. 8, 2005

(54) LIGHT SCANNING DEVICE AND IMAGE FORMING APPARATUS

(75) Inventor: Masato Yokoyama, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 124 days.

(21) Appl. No.: 10/437,135

(22) Filed: May 13, 2003

(65) Prior Publication Data

US 2004/0041992 A1 Mar. 4, 2004

(30) Foreign Application Priority Data

May 20, 2002 (JP) ........................................ 2002-144725

(51) Int. Cl.[7] .............................................. G02B 26/10
(52) U.S. Cl. ...................... 347/119; 347/118; 347/242; 347/257
(58) Field of Search ................................ 347/118, 119, 347/242, 257; 359/216, 204

(56) References Cited

U.S. PATENT DOCUMENTS

| | | | |
|---|---|---|---|
| 4,578,688 A | * | 3/1986 | Okuno ........................ 347/118 |
| 5,321,483 A | | 6/1994 | Yokoyama et al. |
| 5,719,684 A | | 2/1998 | Ohkaji et al. |
| 5,799,229 A | | 8/1998 | Yokoyama et al. |
| 5,878,317 A | | 3/1999 | Masuda et al. |
| 5,946,529 A | | 8/1999 | Sato et al. |
| 6,052,211 A | * | 4/2000 | Nakajima ................... 359/204 |
| 2004/0047016 A1 | * | 3/2004 | Cannon et al. ............. 359/204 |
| 2004/0047389 A1 | * | 3/2004 | Cannon et al. ............. 372/101 |

* cited by examiner

Primary Examiner—Huan Tran
(74) Attorney, Agent, or Firm—Cooper & Dunham LLP

(57) ABSTRACT

A light scanning device adjusts scanning speed uniformity with high accuracy to obtain an image having fine absolute position accuracy. The light scanning device is mounted on an image forming apparatus. The light scanning device includes a scanning speed uniformity adjusting mechanism that can move a reflection mirror around the axis that is orthogonal to a main scanning corresponding direction and parallel to a reflection surface of the reflection mirror. The light scanning device further includes a scanning line inclination adjusting mechanism that can move an optical element around the axis orthogonal to the main scanning corresponding direction and orthogonal to the sub-scanning corresponding direction. The optical element has a function of adjusting a scanning line position.

21 Claims, 15 Drawing Sheets

74 (76, 78, 80)

FIXED SIDE

ADJUSTING SIDE

ADJUSTING SIDE

FIXED SIDE

BEFORE ADJUSTMENT

AFTER ADJUSTMENT

POSITION IN MAIN SCANNING CORRESPONDING DIRECTION

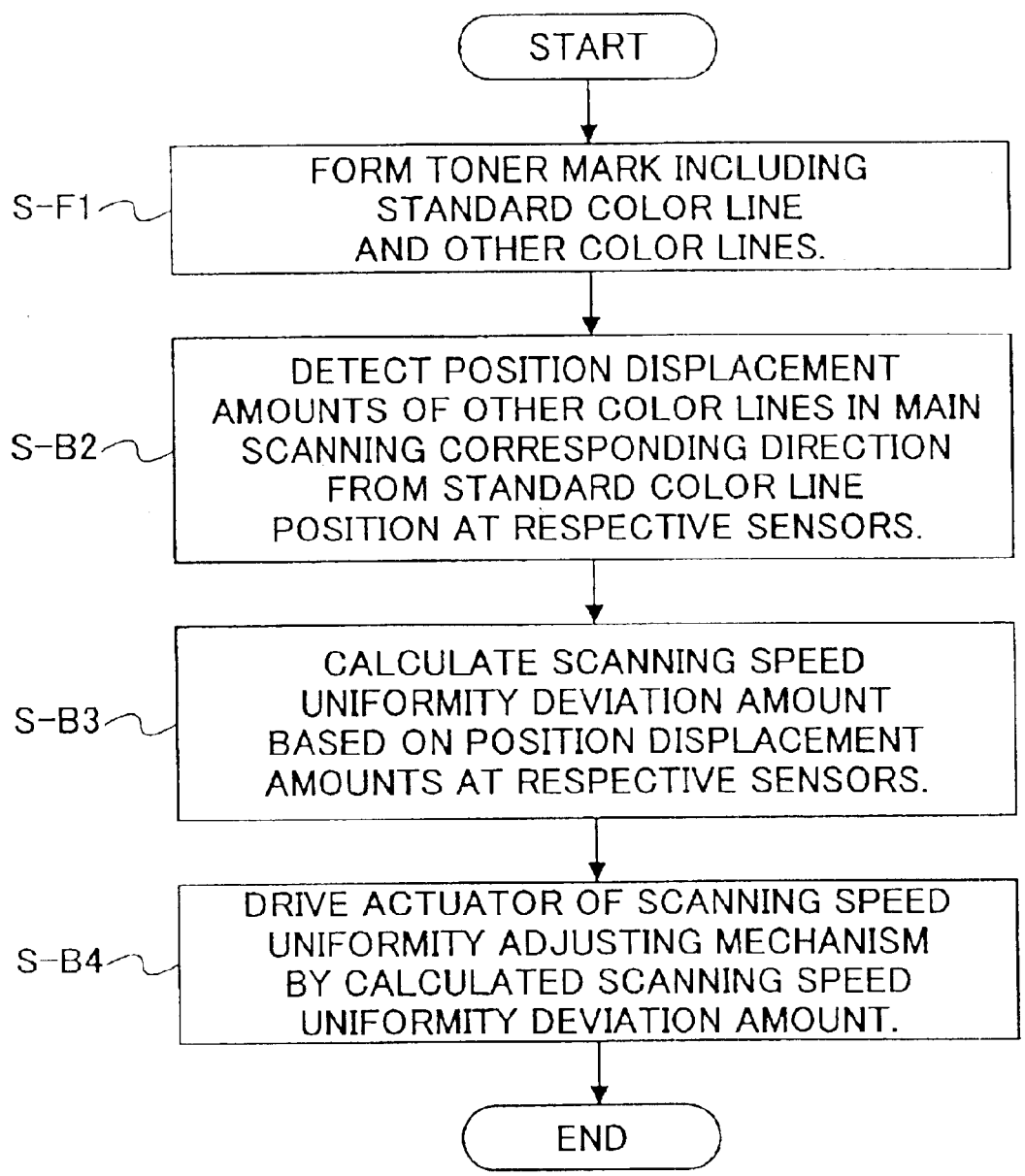

LIGHT SCANNING DEVICE AND IMAGE FORMING APPARATUS

BACKGROUND OF THE INVENTION

1. Field of the Invention

The present invention relates to a light scanning device that emits a light beam to a scanned surface of a latent image holding body so as to form a latent image on the scanned surface. The present invention also relates to an image forming apparatus that has this light scanning device and forms an image by an electrostatic printing process.

2. Description of the Related Art

An image forming apparatus has a light scanning device that emits a light beam to a scanned surface of a latent image holding body so that a latent image can be formed on the scanned surface of the latent image holding body. Examples of this type of image forming apparatus are a copier, a printer, a facsimile machine, a plotter, and the like. The image forming apparatus can be roughly classified as follows.

As a first classification, cited is a mono-color (e.g., monochrome) image forming apparatus. In this image forming apparatus, one light source emits a light beam to one latent image holding body (e.g., a photosensitive body drum) to form a latent image thereon. The latent image formed on the latent image holding body is developed by a developing agent (e.g., black toner) to turn the latent image into a visible image. Thereafter, the developed image is transferred to a transferred material (e.g., paper) by transferring means, and the transferred image is fixed by fixing means.

As a second classification, cited is a color image forming apparatus that produces a multi-color image. In this image forming apparatus, one light source emits a light beam to one latent image holding body (e.g., a photosensitive body drum) to form a latent image thereon. The latent images formed on the latent image holding body are developed by a plurality of developing agents (e.g., yellow toner, magenta toner, cyan toner, black toner) to turn the latent images into visible images of respective colors. The visible images of the respective colors are transferred to a middle transfer body by first transferring means such that the visible images of the respective colors are superposed on each other. The visible image transferred on the middle transfer body is then transferred to a transferred medium (e.g., paper) by second transferring means. Thereafter, the image transferred on the transferred medium is fixed by fixing means so as to produce the multi-color image.

As a third classification, cited is another type color image forming apparatus that produces a multi-color image. In this color image forming apparatus, a plurality of light sources emit light beams, respectively, to latent image holding bodies (e.g., photosensitive body drums) that are arranged side by side. In this light beam emission, latent images are formed on the latent image holding bodies, respectively. The latent images formed on the respective latent image holding bodies are developed by respective developing agents (e.g., yellow toner, magenta toner, cyan toner, and black toner) so as to turn the latent images into visible images. Thereafter, a transferred material (e.g., paper) held by a transfer carrying belt or the like are successively sent to a transfer unit of each latent image holding body. In this manner, the visible images of respective colors formed on the respective latent image holding bodies are transferred to a transferred material (e.g., paper) such that the visible images of the respective colors are superposed on each other. The image transferred on the transferred material is then fixed to produce the multi-color image.

As a fourth classification, cited is another type color image forming apparatus. In this color image forming apparatus, a plurality of light sources emit light beams, respectively, to a plurality of latent image holding bodies (e.g., photosensitive body drums) that are arranged side by side. In this manner, latent images are formed on the latent image holding bodies, respectively. The latent images formed on the respective latent image holding bodies are developed by respective developing agents (e.g., yellow toner, magenta toner, cyan toner, and black toner) to turn the latent images into visible images. Thereafter, the respective visible images are transferred to a middle transfer body by first transferring means such that the visible images of the respective colors are superposed on each other. Then, a transferred material (e.g., paper) held by a transfer carrying belt or the like is sent to a second transfer unit of second transferring means. In this manner, the image formed on the middle transfer body is transferred to the transferred material by the second transferring means. Then, the image transferred to the transferred material is fixed by fixing means.

As for the light scanning device that is mounted on the image forming apparatus having any one of the above-described structures, it is demanded that this light scanning device should have fine position characteristics as described in the following. FIGS. 1A through 1F show positions of an actual image that are displaced from an ideal position.

FIG. 1A shows position displacement in a direction corresponding to a sub-scanning direction (hereinafter, referred to as the sub-scanning corresponding direction). In the state shown in FIG. 1A, a scanning line is displaced in parallel from an ideal scanning line. This displacement of the scanning line is caused by sub-scanning corresponding direction characteristics of optical elements, geometric arrangement accuracy of the optical elements, and thermal expansion.

FIG. 1B shows a scanning line inclined in the sub-scanning corresponding direction. In the state of FIG. 1B, the scanning line is inclined from an ideal scanning line in the sub-scanning corresponding direction. This inclination of the scanning line is caused by sub-scanning corresponding direction characteristics of the optical elements, and the geometrical arrangement accuracy of the optical elements.

FIG. 1C shows a scanning line that is curved in the sub-scanning corresponding direction. In the state of FIG. 1C, the scanning line is curved from an ideal scanning line in the sub-scanning corresponding direction. This curve of the scanning line is caused by the sub-scanning corresponding direction characteristics of the optical elements, geometrical shape accuracy of the optical elements, and deformation of the optical elements.

FIG. 1D shows a scanning line that is displaced in a direction corresponding to a main scanning direction (hereinafter, referred to as the main scanning corresponding direction). In the state of FIG. 1D, an image writing start position is displaced each time scanning is performed (image forming position displacement). For the easy illustration of FIG. 1D, the scanning line of which start position is displaced is offset in the sub-scanning corresponding direction. One cause of this image writing start position displacement is that N surfaces of a polygon mirror of the light scanning device have different surface inclinations. Another cause is that light amounts of respective image forming modes are different. Still another cause is that laser wavelengths of N laser diodes are subtly different in multi-beam scanning (that is a method in which N scanning lines are formed in the sub-scanning corresponding direction by using the N laser diodes by one scanning operation).

FIG. 1E shows magnification change in the main scanning corresponding direction. In the state of FIG. 1E, the length of the scanning line in the main scanning corresponding direction is different from the length of an ideal scanning line. This magnification change is caused by the sub-scanning corresponding direction characteristics of the optical elements, the geometrical arrangement accuracy of the optical elements, and thermal expansion. Furthermore, another cause is that wavelengths of N laser diodes are subtly different in multi-beam scanning (that is a method in which N scanning line are formed in the sub-scanning direction by using the N laser diodes by one scanning operation).

FIG. 1F shows the scanning speed difference in the main scanning direction. In the state of FIG. 1F, the scanning speed is microscopically different in the main scanning direction, so that the light beam is not written in an ideal position in the main scanning direction. This scanning speed difference is caused by the main scanning direction characteristics of the optical elements, the geometric arrangement accuracy, and thermal expansion.

As for the state of FIG. 1A, the light emitting timing is adjusted with respect to the sub-scanning corresponding direction so as to be adjusted with respect to the end part of the paper coming to the transfer unit. Accordingly, at the side of the main body of the image forming apparatus, it is enough to perform adjustment to the degree that the light scanning device does not interfere with members or elements of the main body of the image forming apparatus. Thus, high accuracy adjustment is not needed at the side of the main body of the image forming apparatus. In the color image forming apparatuses as in the above-mentioned third and fourth classifications, detection means (using a light beam or an image) for setting the light emission timing need to be provided for each color at the main body of the color image forming apparatus.

As for the state of FIG. 1B, out of the mono-color image forming apparatus as in the above-mentioned first classification, the mono-color image forming apparatus that does not require high position accuracy can obtain necessary scanning inclination characteristics by attaining the necessary accuracy or the like of members and/or elements of the light scanning device. On the other hand, in the case of the image forming apparatus that requires relatively high position accuracy, a parallel degree is adjusted at an attachment part where the light scanning device is attached to the main body of the image forming apparatus, in order to obtain the necessary inclination characteristics of an ultimately formed image. Furthermore, in the case of the light scanning device mounted on the image forming apparatuses as in the above-mentioned third and fourth classifications, a scanning inclination adjusting mechanism moves (or rotates) a reflection mirror around the axis orthogonal to the main scanning corresponding direction and orthogonal to the reflection surface in order to perform inclination adjustment in the light scanning device and to adjust a parallel degree of the light scanning device with respect to the main body of the image forming apparatus.

As for the state of FIG. 1C, out of the image forming apparatuses of the above-mentioned first and second classifications that have a single optical path, the image forming apparatus that does not require high position accuracy can realize the necessary scanning line curve characteristics by attaining the necessary accuracy or the like of members and/or elements of the light scanning device. In some of the image forming apparatuses of the above-mentioned third and fourth classifications that require relatively high position accuracy and include the light scanning device having a plurality of optical paths, a center part of the optical element that has a function of adjusting a scanning line position with respect to the sub-scanning corresponding direction is deformed so as to adjust the scanning line curve.

As for the state of FIG. 1D, light detecting means that include a photo diode element or the like are provided in the light scanning device or at the main body of the image forming apparatus so as to be positioned at an area outside an image forming area. By using as a reference timing a timing at which light passes the light detecting means, the light scanning for forming an image based on image information starts. That is, by using this reference timing, the writing start position in the main scanning corresponding direction is determined. In the case where the writing start position displacement is caused by respective different inclinations of the N surfaces of the polygon mirror, the accuracy of the members and/or elements are improved to the level at which the writing start position displacement does not occur. In the case where the writing start position displacement is caused by the light amount difference in the image forming modes, or caused by the laser diode wavelength subtle difference in the multi-beam scanning, the writing is started at the timing that is adjusted in accordance with light amounts of the respective image forming modes.

As for the state of FIG. 1E, out of the mono-color image forming apparatus as in the above-mentioned first classification, the image forming apparatus that does not require high position accuracy, the necessary expansion characteristics can be obtained with accuracy including the thermal expansion of the members and/or elements of the light scanning device. On the other hand, in some of the image forming apparatuses that require relatively high position accuracy, the light detecting means that include a photo diode element is provided in the light scanning device or at the main body of the image forming apparatus so as to be positioned at both a writing start side and a writing end side outside the image forming area. The magnification is calculated based on the ratio between a reference time period and a detected time period that is a period from the time the light passes the light detecting means at the writing start side to the time the light passes the light detecting means at the writing end side. In this manner, the magnification in the main scanning corresponding direction is adjusted such that the image frequency is changed so as to agree with the reference time period. Further, in the case of the color image forming apparatuses as in the above-mentioned third and fourth classifications, the magnification difference between the optical paths directly leads to image quality degradation such as color difference. Accordingly, in such a color image forming apparatus, in the case where the optical elements are made of a material such as resin having a refractive index that is greatly changed by temperature, it is essential to provide the above-described two light detecting means provided at the writing start side and the writing end side.

As for the state of FIG. 1F, out of the mono-color image forming apparatus, the image forming apparatus that does not require high position accuracy can obtain necessary scanning speed uniformity with accuracy including the thermal expansion of the members and/or elements of the light scanning device. Meanwhile, in the case of the color image forming apparatus (as in the above-mentioned third classification) that does not require high absolute position accuracy, the same optical path is used for the respective colors, so that the difference in the scanning speed uniformity between the colors does not occur. Accordingly, in the case of such a color image forming apparatus of the second classification, it is possible to obtain the necessary scanning speed uniformity with the accuracy including the thermal expansion of the members and/or elements of the light scanning device. However, in the case of the high accuracy plotters in the above-mentioned first and second classifications that require absolute position accuracy, and in the case of the color image forming apparatuses in the above-mentioned third and fourth classifications that use the different optical paths for the respective colors, the changed image frequency is provided in the scanning region, but it is difficult to realize microscopically successive variation of the image frequency. As a result, there is a possibility that a problem such as an image including an undesirable line caused by a lack of dot pitch uniformity in the main scanning corresponding direction occurs. Furthermore, in the case where the optical elements that have a function of adjusting the position of the scanning line in the main scanning corresponding direction are made of a material such as the resin having a refractive index that is greatly changed by temperature, there is a possibility that the temperature distribution in the optical element causes the scanning speed uniformity to be greatly changed. Accordingly, it is necessary to make many different image frequency patterns in the scanning region.

As described above, adjusting means for the position displacement shown in FIGS. 1A through 1E have almost been established. On the other hand, the adjustment for the position displacement shown in FIG. 1F in the case of the resin made optical elements needs to be performed with high accuracy, but a method of adjusting the scanning speed uniformity with high accuracy has not been established yet.

Furthermore, when the light scanning device is mounted on the image forming apparatus, the above-described characteristics are changed due to flatness characteristics of an attachment part of the main body of the image forming apparatus, and the subtle position relation between the light scanning device and the latent image holding body or the transfer unit. Further, in the case where the optical elements having a function of adjusting the position of the scanning line in the main scanning corresponding direction are made of a material such as the resin having a refractive index that is greatly changed by temperature, the above-described characteristics are changed as the temperature of the light scanning device changes. As a result, the image quality is degraded.

SUMMARY OF THE INVENTION

It is an object of the present invention to provide a light scanning device that adjusts scanning speed uniformity with high accuracy to obtain an image having fine absolute position accuracy. It is another object of the present invention to provide an image forming apparatus on which this light scanning device is mounted. It is another object of the present invention to provide an image forming apparatus that includes a light scanning device having a plurality of optical paths in which an image having fine absolute position accuracy and fine scanning speed uniformity between the optical paths can be formed.

According to one aspect of the present invention, there is provided a light scanning device comprising:

at least one reflection mirror;

an optical element having a function of adjusting a scanning line with respect to a sub-scanning corresponding direction;

a scanning speed uniformity adjusting mechanism that moves the reflection mirror around a first axis that is orthogonal to a main scanning corresponding direction and parallel to a reflection surface of the reflection mirror; and a scanning line inclination adjusting mechanism that moves the optical element around a second axis orthogonal to the main scanning corresponding direction and orthogonal to the sub-scanning corresponding direction.

According to another aspect of the present invention, there is provided an image forming apparatus comprising:

a latent image holding body;

charging means for charging a surface of the latent image holding body uniformly;

a light scanning device that forms a latent image on the surface of the latent image holding body;

developing means for developing the latent image into a visible image by using a developing agent;

wherein the light scanning device comprises:

at least one reflection mirror;

an optical element having a function of adjusting a scanning line with respect to a sub-scanning corresponding direction;

a scanning speed uniformity adjusting mechanism that moves the reflection mirror around a first axis that is orthogonal to a main scanning corresponding direction and parallel to a reflection surface of the reflection mirror; and a scanning line inclination adjusting mechanism that moves the optical element around a second axis that is orthogonal to the main scanning corresponding direction and orthogonal to the sub-scanning corresponding direction.

According to another aspect of the present invention, the image forming apparatus further comprises a transfer carrying belt that carries a transferred material to a transfer position where the visible image is transferred to the transferred material, wherein the transfer carrying belt comprises at least two position detection sensors that are arranged along the main scanning corresponding direction and that detect a position of the visible image on the transfer carrying belt with respect to the main scanning corresponding direction and the sub-scanning corresponding direction and the image forming apparatus has a configuration of driving the actuator of the scanning speed uniformity adjusting mechanism or/and the scanning line inclination adjusting mechanism, based on information obtained by the position detection sensors.

According to another aspect of the present invention, the image forming apparatus further comprises a middle transfer body to which the visible image on the latent image holding body is transferred and that holds the visible image transferred thereto, wherein the middle transfer body comprises at least two position detection sensors that are arranged along the main scanning corresponding direction and that detect a position of the visible image on the middle transfer body with respect to the main scanning corresponding direction and the sub-scanning corresponding direction and the image forming apparatus has a configuration of driving the actuator of the scanning speed uniformity adjusting mechanism or/and the scanning line inclination adjusting mechanism, based on information obtained by the position detection sensors.

BRIEF DESCRIPTION OF THE DRAWINGS

FIG. 18 is a flow chart showing a process of adjusting a color difference caused by scanning speed uniformity deviation in the main scanning corresponding direction.

DETAILED DESCRIPTION OF THE PREFERRED EMBODIMENTS

Embodiments of the present invention will be described with reference to the drawings.

An image forming apparatus in the embodiments of the present invention is described as an image forming apparatus of the above-mentioned third classification. However, the same functions and advantages of the present invention can also be realized in the case of the image forming apparatus of the above-mentioned fourth classification. The present invention may also be applied to the image forming apparatuses of the above-mentioned first and second classifications that include a light scanning device having a single optical path, so that absolute accuracy of an image formed by the single optical path can be improved.

Figure 2:
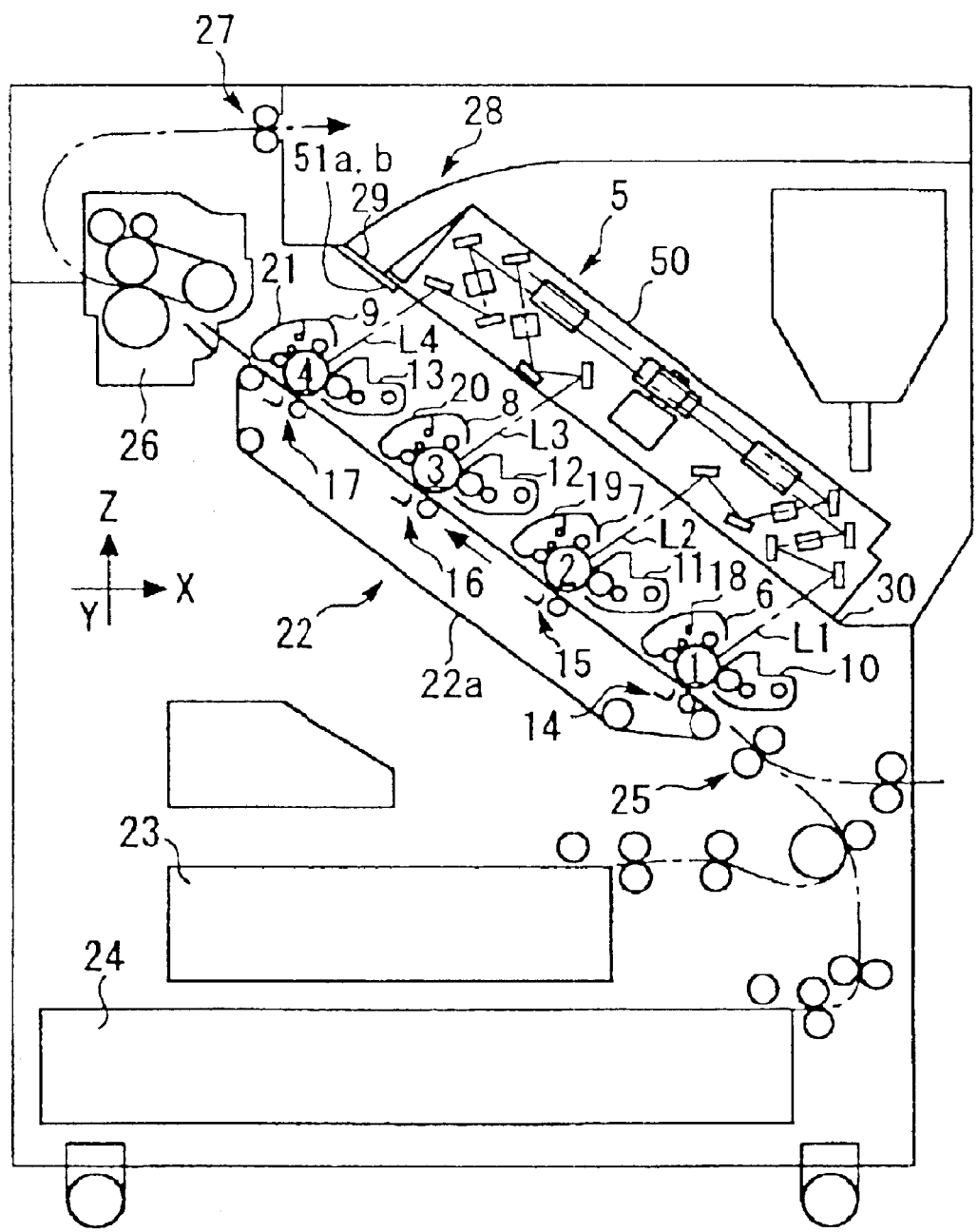
FIG. 2 is a cross-sectional view of an image forming apparatus according to one embodiment of the present invention.

FIG. 2 is a cross-sectional view of an image forming apparatus according to one embodiment of the present invention. The image forming apparatus shown in FIG. 2 includes a plurality of drum-shaped photoconductive photosensitive bodies 1, 2, 3 and 4 (hereinafter, referred to as the photoconductive drum) as latent image holding bodies that are arranged side by side as viewed in FIG. 2. In one example, these photoconductive drums 1, 2, 3 and 4 correspond to a yellow color (Y), a magenta color (M), a cyan color (C), and a black color (Bk), respectively, and are provided for forming the images corresponding to these colors. Around these four photoconductive drums 1, 2, 3 and 4, provided are charging units 6, 7, 8 and 9 (charging rollers, charging brushes, chargers, and the like), exposure parts for light beams L1, L2, L3 and L4 provided from an light scanning device 5, developing units 10, 11, 12 and 13 (developing devices for respective colors Y, M, C and Bk), and cleaning units 18, 19, 20 and 21 (cleaning blades, cleaning brushes and the like). Furthermore, a transfer carrying device 22 is provided around the photoconductive drums. The transfer carrying device 22 includes a transfer carrying belt 22a and transfer means (transfer rollers, transfer brushes, and the like) 14, 15, 16 and 17 that are provided at an inside surface of the transfer carrying belt 22a. These are provided for forming an image by an electrophotographic process. In the structure shown in FIG. 2, images corresponding to the respective colors can be formed on the photoconductive drums 1, 2, 3 and 4, respectively.

The light scanning device 5 is arranged at the oblique upper side of the four photoconductive drums 1, 2, 3 and 4.

Figure 3:
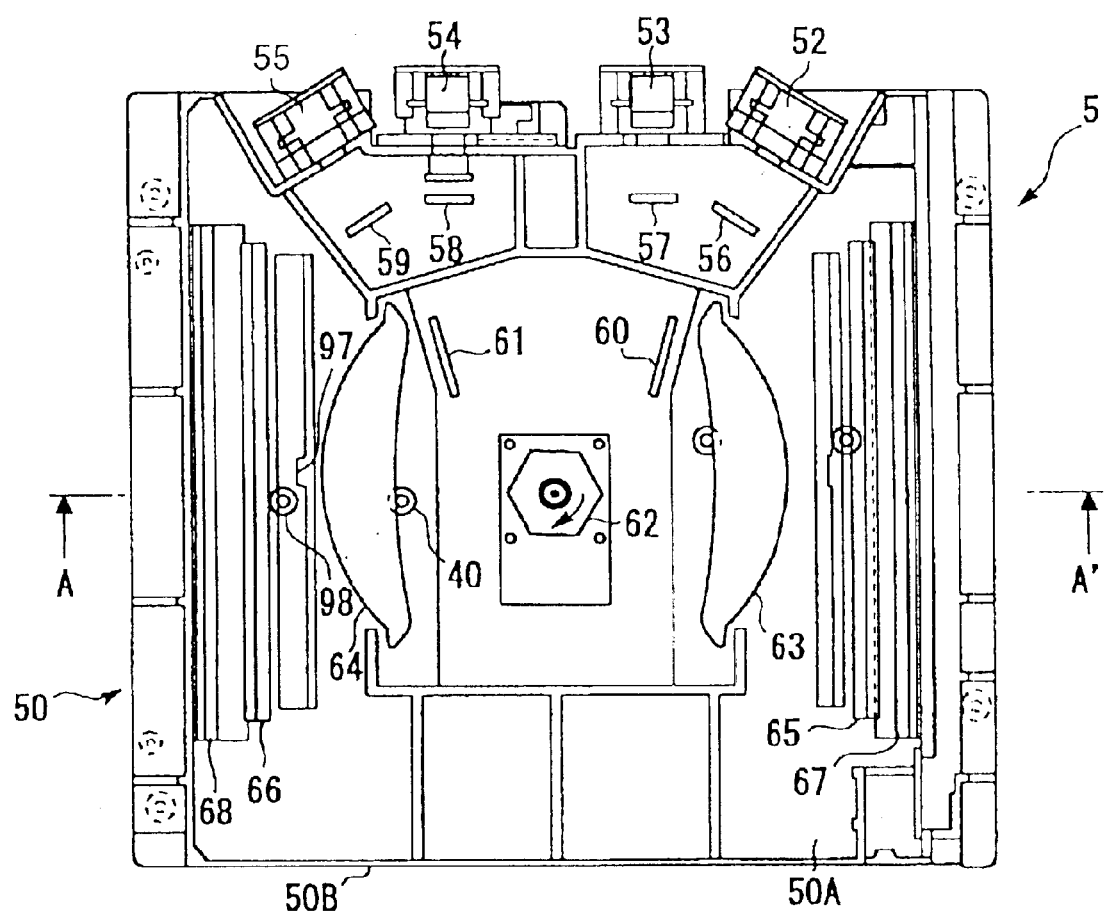
FIG. 3 is a top view of a light scanning device that is mounted on the image forming apparatus shown in FIG. 2.
Figure 4:
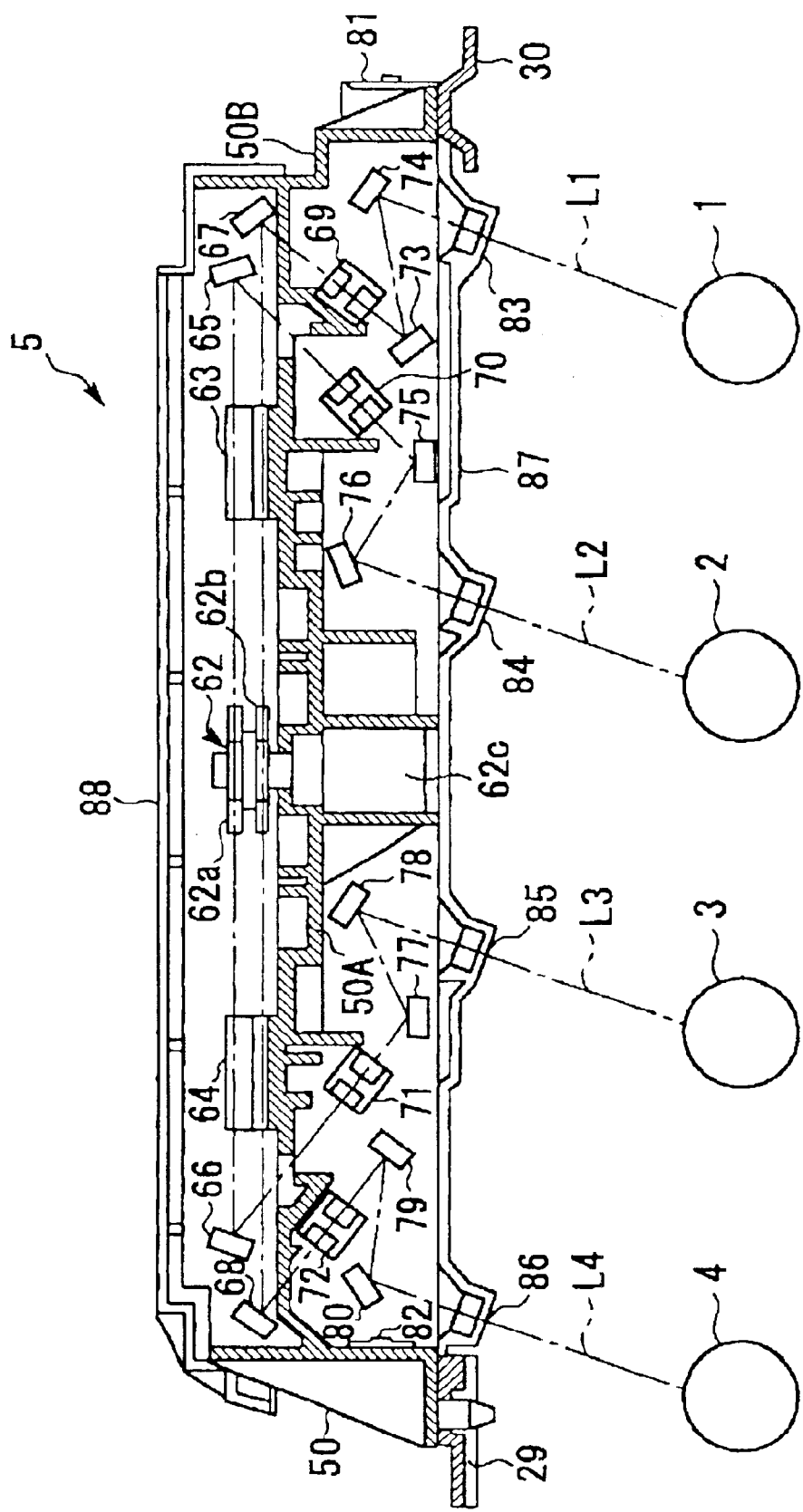
FIG. 4 is a cross-sectional view taken along the A–A' line of FIG. 3.

Next, the light scanning device 5 will be described. FIG. 3 is a top view of the light scanning device 5 of the image forming apparatus according to the exemplary embodiment of the present invention. FIG. 4 is a cross-sectional view of the light scanning device 5 taken along the A–A' line of FIG. 3.

In the example of FIG. 3, this light scanning device 5 includes four light source units 52, 53, 54 and 55, and a beam deflection unit 62. At the time of scanning, this light deflection unit 62 distributes the light beams L1, L2, L3 and L4 to the two symmetrical sides of the light deflection unit 62. The light scanning device 5 has an optical system that guides the light beams L1, L2, L3 and L4 to corresponding scanned surfaces of the photoconductive drums 1, 2, 3 and 4, respectively, so that images can be formed on the scanned surfaces of the photoconductive drums 1, 2, 3 and 4, respectively. At this time, the light beams L1, L2, L3 and L4 are deflected by the light deflection unit 62. This optical system includes imaging lenses 63, 64, 69, 70, 71, and 72 (optical elements), light reflection mirrors 65, 66, 67, 68, 73, 74, 75, 76, 77, 78, 79 and 80. These members and elements are accommodated in one housing 50.

The housing 50 includes a base 50A on which the light deflection unit 62 and the elements of the optical system are provided, and includes a frame-shaped side wall 50B that surrounds the base 50A. To be specific, the base 50A is positioned at an approximately center part of the side wall 50B such that the base 50A isolates the inside of the housing 50 into an upper part and a lower part. The four light source units 52, 53, 54 and 55 are provided at the side wall 50B of the housing 50. The light deflection unit 62 is mounted at approximately the center part of the base 50A of the housing 50. Some of the optical members and elements of the optical system (the imaging lenses 63, 64, 69, 70, 71 and 72, and the light reflection mirrors 65, 66, 67, 68, 73, 74, 75, 76, 77, 78, 79 and 80) are provided at the upper surface side of the base 50A. The other optical members and members of the optical system are provided at the lower surface side of the base 50A. A cover 87 is provided at the lower part of the housing 50, and a cover 88 is provided at an upper part of the housing 50. Openings through which the light beams pass are formed on the cover 87 at the lower part of the housing 50. Dust prevention glasses 83, 84, 85 and 86 are attached with respect to these openings, respectively.

Image data including divided color data is input to the light scanning device 5 from an image reading device (scanner, for example) not shown in the drawings or from an image data output device (a personal computer, word processor, a receiving unit of a facsimile machine). In the light scanning device 5, the input image data including divided color data is converted into light source driving signals. The light source driving signals drive the light sources (semiconductor lasers (laser diodes)) in the light source units 52, 53, 54 and 55 to emit the light beams, respectively. The light beams emitted from the light source units 52, 53, 54 and 55 pass through cross-scan error compensation cylindrical lenses 56, 57, 58 and 59, and directly or via mirrors 60 and 61 lead to light deflection unit 62. When the light beams lead to the light scanning unit 62, the light beams are deflected into the two symmetrical sides (two symmetrical directions) by bi-level polygon mirrors 62a and 62b that are rotated at a constant velocity by a polygon motor 62c. In the structure of FIG. 4, the polygon mirror 62a is provided at an upper level for the light beams L2 and L3, and the polygon mirror 62b is provided at a lower level for the light beams L1 and L4. Alternatively, one thick polygon mirror may be provided for deflection scanning of the four light beams.

The light beams are deflected into the two sides by the polygon mirrors 62a and 62b of the light deflection unit 62 such that the two light beams are deflected to one side, and the other two light beams are deflected to the other side. The deflected light beams at the respective sides pass through first imaging lenses 63 and 64, each of which includes an fθ lens. The fθ lenses have a function of adjusting the position of the scanning line with respect to the main scanning corresponding direction. Then, the light beams are reflected by first reflection mirrors 65, 66, 67 and 68, and pass through the respective openings of the base 50A. The light beams that pass through the openings then pass through the second imaging lenses 69, 70, 71 and 72 that include wide toroidal lenses (WTL). The wide (long) toroidal lenses have a function of adjusting the position of the scanning line with respect to the sub-scanning corresponding direction. Then, the light beams are guided to the scanned surfaces of the photoconductive drums 1, 2, 3 and 4 via the second reflection mirrors 73, 75, 77 and 79, the third reflection mirrors 74, 76, 78 and 80, and the dust prevention glasses 83, 84, 85 and 86. In this manner, the electrostatic latent images for the respective colors are written on the scanned surfaces of the photoconductive drums 1, 2, 3 and 4.

In the light scanning device 5, the four light source units 52, 53, 54 and 55 each include a semiconductor laser source (laser diode (LD)) and a collimating lens that collimates a light flux emitted from the semiconductor laser source. The semiconductor laser source and the collimating lens are incorporated in a holder of each of the light source units 52, 53, 54 and 55. However, in the case of the light source unit (e.g., the light source unit 54 shown in FIG. 10) for a black color that is used many times for forming a black and white image, the this light source unit for a black color may have a multi-beam configuration in which two or more combinations of the light source (laser diode LD) and the collimating lens are incorporated into the light source unit in order to enable high speed writing. Furthermore, in the case of the multi-beam configuration, if the light source unit is configured so as to rotate around the optical axial direction relative to the side wall 50B of the housing, it is possible to adjust a beam pitch with respect to the sub-scanning corresponding direction, so that pixel density can be changed (e.g., to 600 dpi, 1200 dpi, and so on) at the time of the black and white image forming operation.

Synchronization detecting mirrors (not shown in the drawings) that pick up the light flux corresponding to the scanning start position of the main scanning direction are provided in the optical paths of the respective light beams L1, L2, L3 and L4, respectively. The light flux reflected by respective synchronization detecting mirrors is received by the synchronization detecting units 81 and 82 to output a synchronizing signal for initiating scanning.

The light beam is deflected in the main scanning corresponding direction by the operation of the light deflection unit 62. The main scanning corresponding direction corresponds to the axial direction of each of the photoconductive drums 1 through 4. The direction orthogonal to the main scanning corresponding direction is the sub-scanning corresponding direction.

Figure 5A:
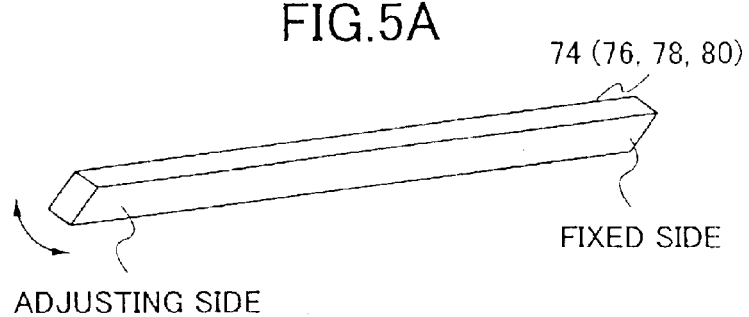
FIGS. 5A, 5B and 5C show one example of the structure of a scanning speed uniformity adjusting mechanism.
Figure 5B:
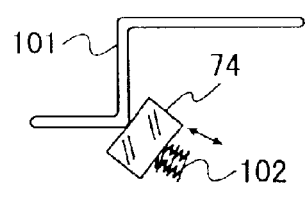
Figure 5C:
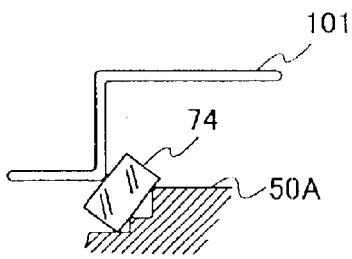

According to this embodiment, a scanning speed uniformity adjusting mechanism may be provided at each of the third reflection mirrors 74, 76, 78 and 80 in the respective optical paths. FIGS. 5A, 5B and 5C show one example of the configuration of the scanning speed uniformity adjusting mechanism. As shown in FIGS. 5A, 5B and 5C, one end of the third reflection mirror 74, 76, 78 or 80 is fixed at a fixing side, and the other end of the third reflection mirror at a adjusting side is structured so as to be movable for adjustment. As shown in FIG. 5B, the adjusting side of each of the third reflection mirrors 74, 76, 78 and 80 is structured by a lead screw 102 and a leaf spring 101. As shown in FIG. 5C, at the fixing side, each of the third reflection mirrors 74, 76, 78 and 80 is fixed by the base 50A and the leaf spring 101.

In this structure of the scanning speed uniformity adjusting mechanism, operating the lead screw 102 causes the third reflection mirror 74, 76, 78 or 80 to be moved (or rotated) around the axis that is orthogonal to the main scanning corresponding direction and parallel to the reflection surface of each of the third reflection mirrors. Furthermore, position information measuring means (not shown in the drawings) disposed at the photoconductive drum below the light scanning device 5 measure an amount of position displacement from an ideal position. In accordance with the displacement amount measured by the position information measuring means, it is possible to perform the adjustment for the scanning speed uniformity deviation so as to bring the scanning speed uniformity into an ideal scanning speed uniformity state.

Figure 6:
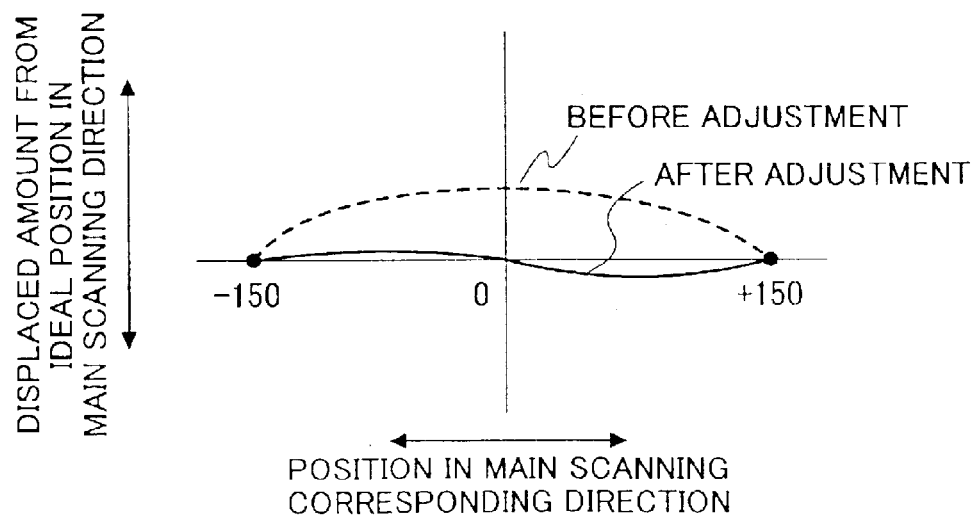
FIG. 6 is an illustration of plots showing scanning positions in a main scanning corresponding direction and showing the amounts of position displacement from ideal positions in the main scanning corresponding direction.

FIG. 6 is an illustration of plots showing scanning positions in the main scanning corresponding direction and showing position displacement amounts from ideal positions in the main scanning corresponding direction. The dashed line in FIG. 6 shows the scanning positions displaced from ideal positions before the adjustment is performed. By rotating the lead screw 102, the third reflection mirror 74, 76, 78 or 80 is moved (or rotated) around the axis that is orthogonal to the main scanning direction and parallel to the reflection surface of the third reflection mirror. The solid line in FIG. 6 shows the result of this adjustment performed by rotating the lead screw 102.

However, there are many cases where the scanning line is inclined from an ideal scanning line after the adjustment for the scanning speed uniformity is performed. This is because the respective components or elements have the different optical characteristics and position accuracy that are not ideal characteristics and accuracy. In order to solve this problem, scanning line inclination adjusting mechanism performs the adjustment to remove the inclination and thereby bring the scanning line into an ideal state.

Figure 7A:
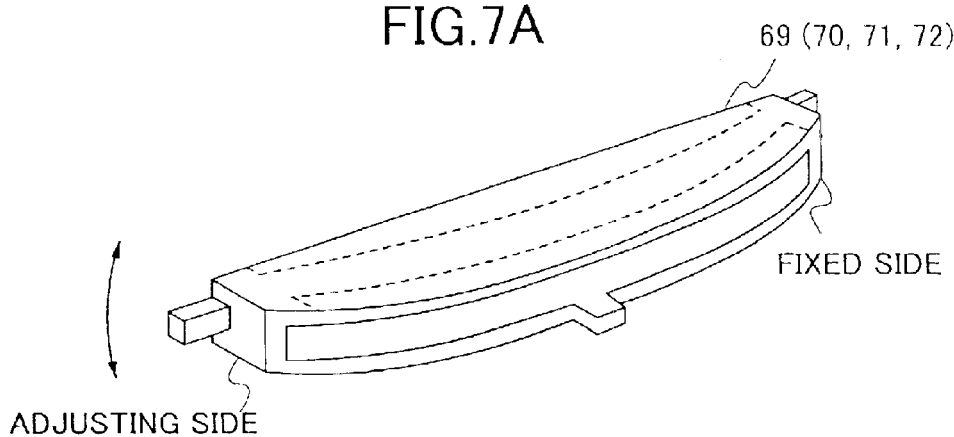
FIGS. 7A, 7B and 7C show one example of the structure of a scanning line inclination adjusting mechanism.
Figure 7B:
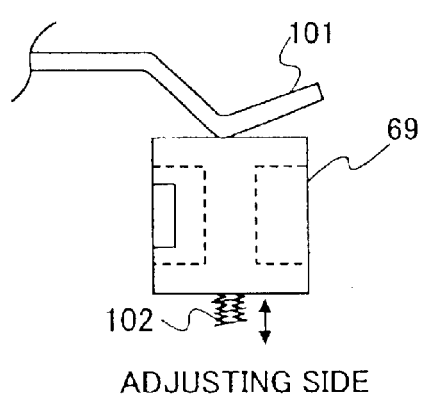
Figure 7C:
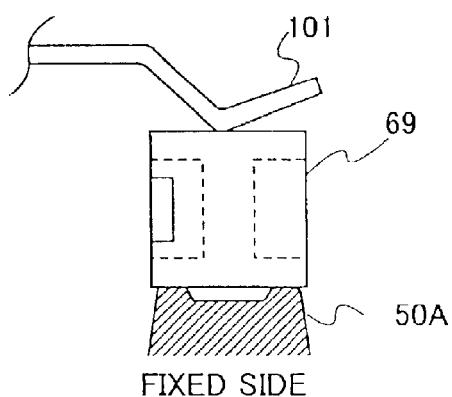

According to this embodiment of the present invention, the scanning line inclination adjusting mechanism may be provided at each of the second imaging lenses 69, 70, 71 and 72 that each include the wide toroidal lens (WTL). The second imaging lenses 69, 70, 71 and 72 have a function of adjusting the position of the scanning line with respect to the sub-scanning corresponding direction. FIGS. 7A, 7B and 7C show one example of the structure of the scanning line inclination adjusting mechanism. As shown in FIGS. 7A, 7B and 7C, one end (a fixing side) of each of the second imaging lens 69, 70, 71 and 72 is fixed, and the other end (an adjusting side) of each of the second imaging lenses 69, 70, 71 and 72 is structured so as to be movable for the adjustment. At the adjusting side, as shown in FIG. 7B, the second imaging lens is structured by a lead screw 102 and a leaf spring 101. At the fixing side, the second imaging lens is fixed by the base 50A and the leaf spring 101 as shown in FIG. 7C.

In this structure of the scanning line inclination adjusting mechanism, operating the lead screw 102 causes the second imaging lens 69, 70, 71 or 72 to be moved (or rotated) around the axis orthogonal to the main scanning corresponding direction and orthogonal to the sub-scanning corresponding direction. Furthermore, the position information measuring means measure the amount of the position displacement from an ideal position of the scanning line. In accordance with the measured position displacement amount, the scanning line inclination can be adjusted by the scanning line inclination adjusting mechanism to remove the inclination and thereby bring the scanning line for each color into an ideal state.

Figure 8:
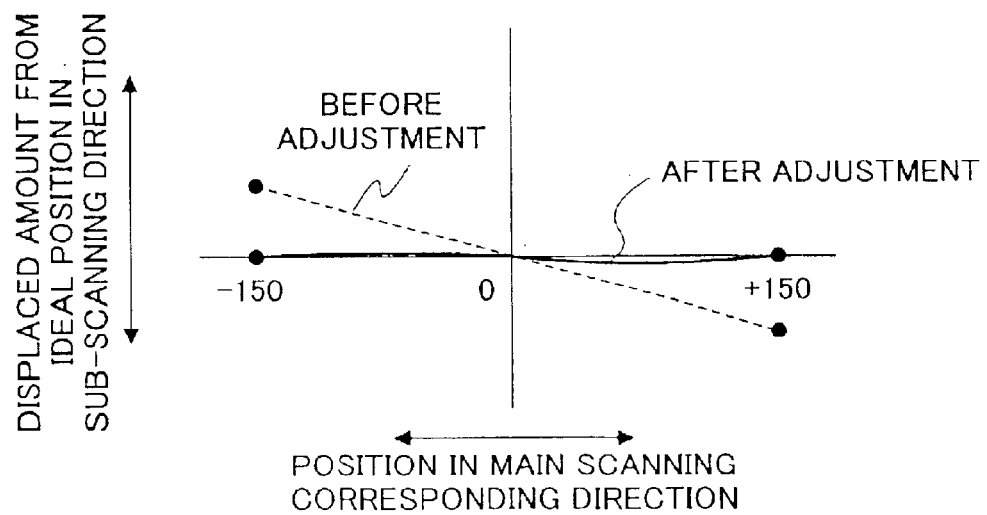
FIG. 8 is an illustration of plots showing scanning positions and showing the amounts of position displacement from ideal positions in the sub-scanning corresponding direction.

FIG. 8 is an illustration of plots showing the scanning positions in the main scanning corresponding direction and the sub-scanning corresponding direction, and showing the amounts of the position displacement from the ideal position in the sub-scanning corresponding direction. The dashed line in FIG. 8 shows the position displacement state in which the position displacement still remains after the scanning speed uniformity adjustment is performed. Rotating the lead screw 102 causes the second imaging lens 69, 70, 71 or 72 to be moved (or rotated) around the axis orthogonal to the main scanning corresponding direction and orthogonal to the sub-scanning corresponding direction to remove the scanning line inclination and thereby bring the scanning line into an ideal state. The solid line in FIG. 8 shows the result of this adjustment performed by rotating the lead screw 102.

The scanning speed uniformity adjustment may be performed prior to the scanning line inclination adjustment, or the scanning line inclination adjustment may be performed prior to the scanning speed uniformity adjustment. By performing both the scanning speed uniformity adjustment and the scanning line inclination adjustment, as shown in FIGS. 6 and 8, it is possible to realize the scanning line that is extremely close to an ideal line (ideal positions).

According to this embodiment of the present invention, the above-described scanning speed uniformity adjustment and the scanning line inclination adjustment may be performed by using the position information measuring means in the condition where the light scanning device 5 is not mounted on the image forming apparatus. However, there is the case where known change such as the known position change of the scanning line occurs after the light scanning device 5 is mounted on the image forming apparatus. Accordingly, in this case, in the condition where the light scanning device 5 is not mounted on the image forming apparatus, the scanning speed uniformity adjustment and the scanning line inclination adjustment may be performed in an offset state.

Figure 9:
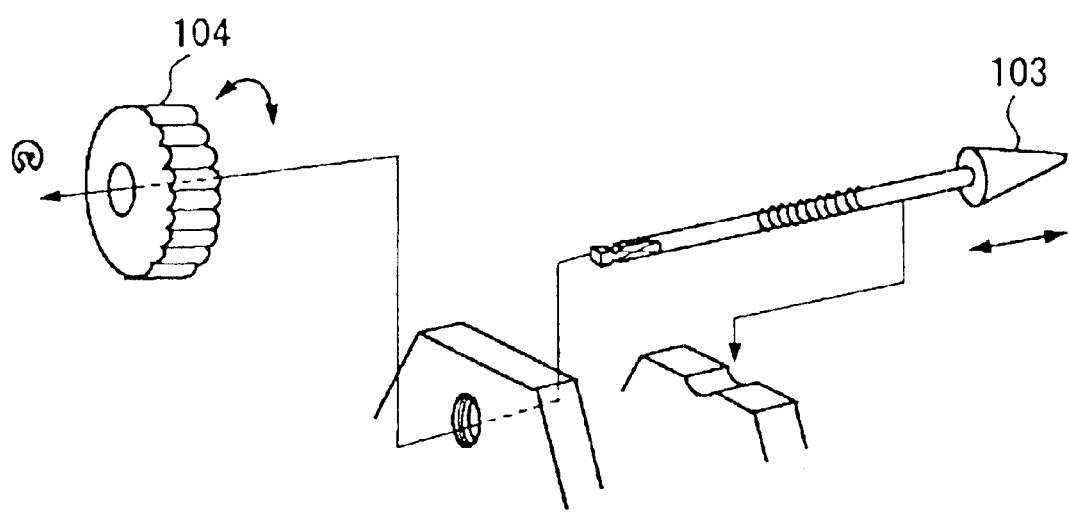
FIG. 9 shows the structure of a lead screw including an adjuster and a knob.
Figure 10:
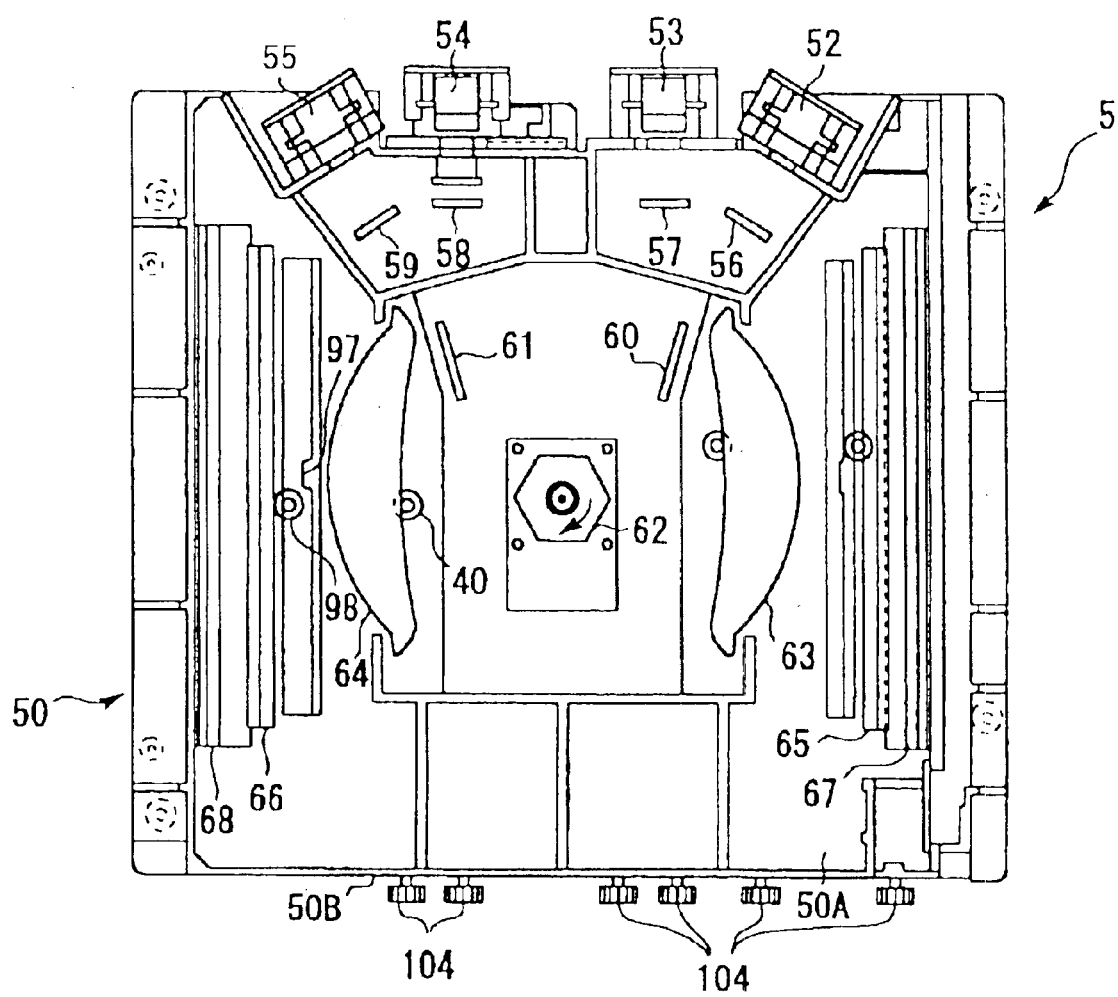
FIG. 10 is a top view of the light scanning device.

Next, the structure for operating the scanning speed uniformity adjusting mechanism and the scanning line inclination adjusting mechanism from outside the image forming apparatus on which the light scanning device 5 is mounted will be described. FIG. 9 shows the lead screw 102 that includes an adjuster 103 and a knob 104. As shown in FIG. 9, the lead screw 102 is structured so as to include the tapered adjuster 103 and the knob 104 so that the lead screw 102 can be operated by rotating the knob 104. FIG. 10 is a top view of the light scanning device 5. As shown in FIG. 10, the knobs 104 are arranged at the side wall 50B of the housing 50. The light scanning device 5 is mounted on the image forming apparatus such that the knobs are positioned at the front surface side of the image forming apparatus. Further, windows (openings) having sizes suitable for operating the knobs are formed in a front side cover of the image forming apparatus. In this structure, it is possible to operate the scanning speed uniformity adjusting mechanism and the scanning line inclination adjusting mechanism in the state where the light scanning device 5 is mounted on the image forming apparatus. In the adjustment operation, the image forming apparatus actually outputs an image, and based on the output image, the knobs 104 are rotated in order to adjust respective characteristics.

All adjusting mechanisms (the scanning speed uniformity adjusting mechanisms and the scanning line inclination adjusting mechanisms) may be configured so as to include the screw 102, the adjuster 103, and the knob 104. However, after the light scanning device 5 is mounted on the image forming apparatus, the necessary minimum number of the adjusting mechanisms (i.e., not all the adjusting mechanisms) may include the above-described structure of the lead screw 102, the adjuster 103, and the knob 104.

In the case where the above-described adjusting mechanisms can be operated from outside the image forming apparatus, it is desirable to provide a closing member that prevents the knob 104 from being operated. In one example, a cover as the closing member is provided at the operation window formed on the front side cover of the image forming apparatus. In another example, a mechanism for locking the rotation of the knob 104 is provided. However, it is preferable to attach the cover with respect to the operation window because the attachment of the cover is easy and convenient for the structure and operation. When the adjusting mechanism is operated, the cover is opened, or the lock of the knob 104 is released to perform the adjustment. After the adjustment is performed, the cover is closed, or the knob 104 is locked by the locking mechanism in order to prevent the knob 104 from being wrongly operated.

According to another embodiment of the present invention, at least one of the lead screws 102 of the scanning speed uniformity adjusting mechanisms and the lead screws 102 of the scanning line inclination adjusting mechanisms may be operated by an electrically controllable actuator having stepping motor, an adjuster, and the like. Alternatively, at least one of the scanning speed uniformity adjusting mechanisms and the scanning line inclination adjusting mechanisms may be configured as any appropriate electrically controllable actuator. When the electrically controllable actuator is applied to the adjusting mechanism, the adjusting operation of the adjusting mechanism can be performed by electrical driving control based on an image result output by the image forming apparatus.

Next, a position displacement detecting structure for detecting position displacement of a toner image formed by the image forming apparatus according to one embodiment of the present invention will be described. In the following example, the position displacement detecting structure is applied to the image forming apparatus that includes a transfer carrying belt. However, the position displacement detecting structure may be applied to the image forming apparatus that includes a middle transfer body.

Figure 11:
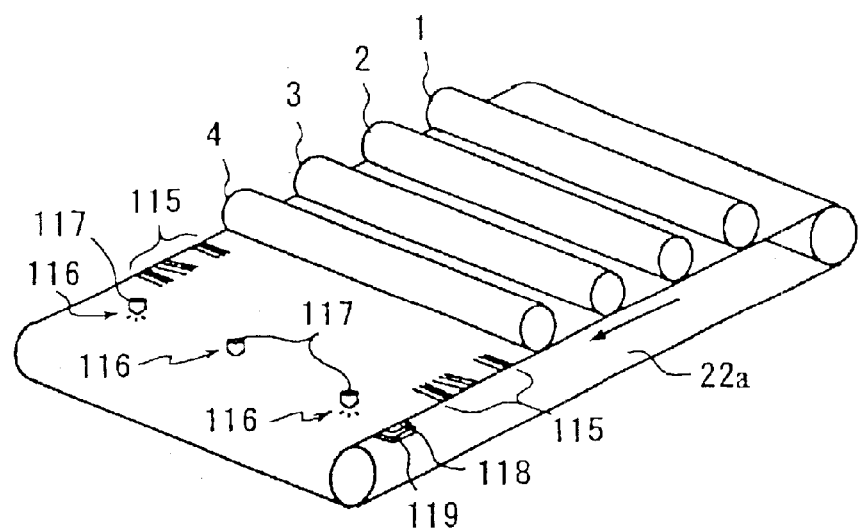
FIG. 11 shows the structure for detecting the position displacement of a toner image.

FIG. 11 shows the position displacement detecting structure for detecting the position displacement of the toner image. The image forming part provided at the main body of the image forming apparatus forms position displacement detection toner marks 115 used for detecting the position displacement, and the toner marks 115 formed by the image forming part including the photoconductive drums is transferred to the transfer carrying belt 22a. Sensors 116 are provided at the downstream side of the transfer carrying belt 22a. These sensors 116 detect the position displacement detection toner marks 115. These sensors 116 are arranged along the direction (the main scanning corresponding direction) orthogonal to the moving direction of the transfer carrying belt 22a. In the example of FIG. 11, three sensors 116 are provided. It is necessary to provide at least two sensors 116. In the case of providing two sensors 116, the two sensors 116 are provided at respective positions near both ends of the transfer carrying belt 22a in main scanning corresponding direction. The position displacement detection marks 115 are formed at positions that will face the sensors 116 accompanying the movement of the transfer carrying belt 22a. In the example of FIG. 11 in which the three sensors 116 are provided, in accordance with required adjustment accuracy, it is possible to select either a first case where the position displacement detection toner marks 115 are formed so as to face the two sensors 116 of the respective both end parts, or a second case where the position displacement toner marks 115 are formed so as to face all of the three sensors 116.

Figure 12:
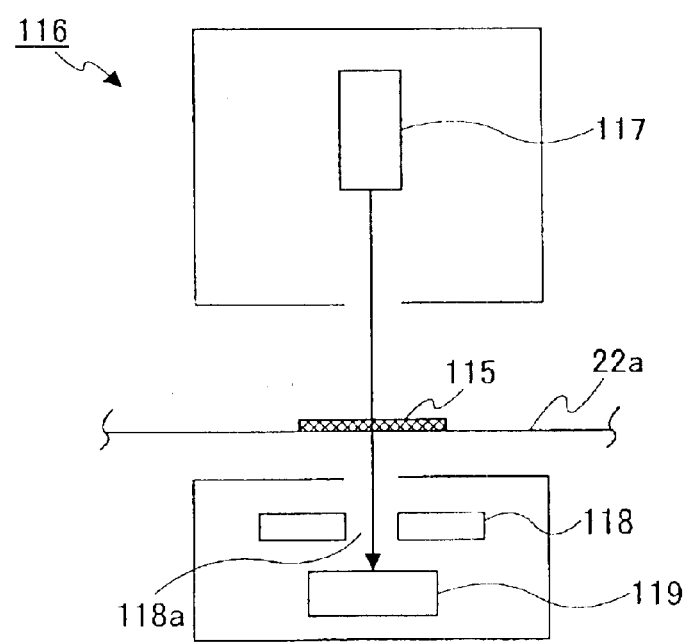
FIG. 12 shows the structure of a sensor.

FIG. 12 shows the structure of the sensor 116. The sensor 116 includes a light emitting element 117 that emits light to the transfer carrying belt 22a. The sensor 116 includes a slit plate 118 on which a slit 118a is formed. The light penetrating the transfer carrying belt 22a passes through the slit 118a. The sensor 116 further includes a light receiving element 119 for receiving the light that passed through the slit 118a. The light receiving element 119 is connected to a signal processing unit 120 (described later) that processes a signal sent from the light receiving element 119.

According to this embodiment, since the transfer carrying belt 22a is made of a transparent material, the transfer carrying belt 22a is located between the light emitting element 117 and the light receiving element 119. However, in the case where the transfer carrying belt 22a is not transparent, the light emitting element 117 and the light receiving element 119 are provided at the same side with respect to the transfer carrying belt 22a. In this case, the light reflected by the surface of the transfer carrying belt 22a passes through the slit 118a, and is received by the light receiving element 119.

Figure 13:
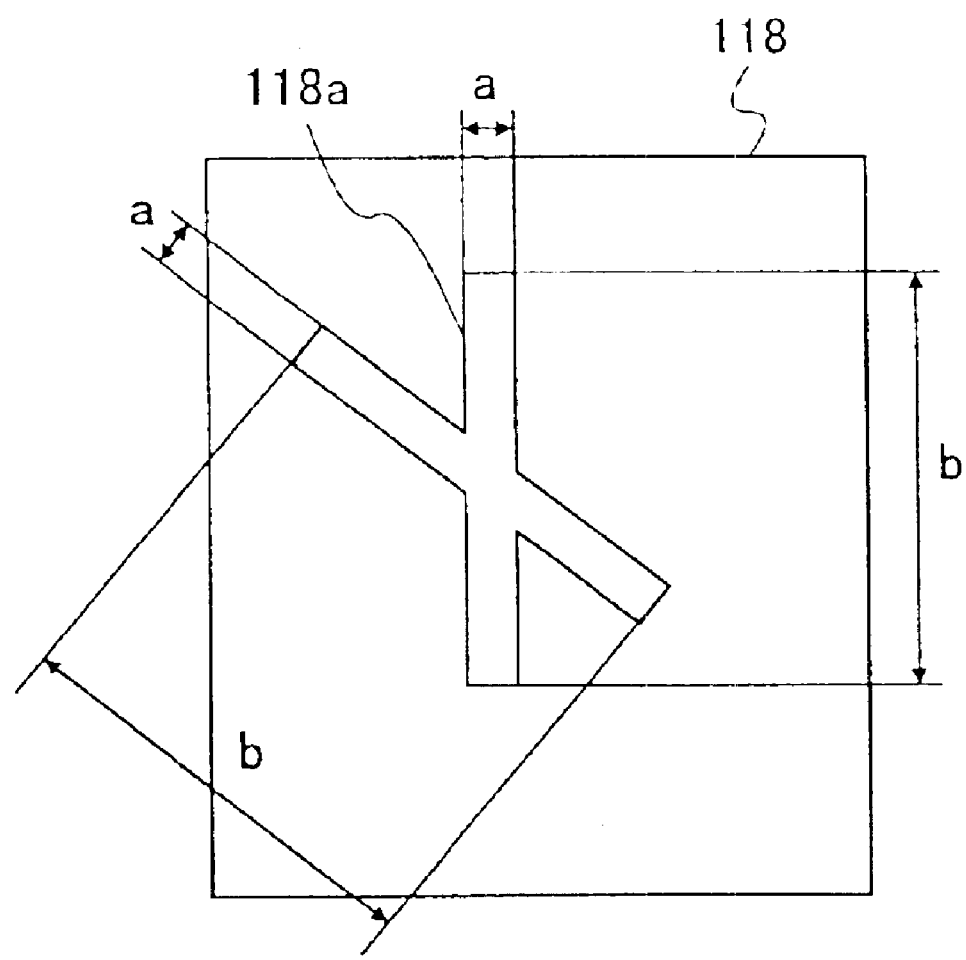
FIG. 13 shows the shape of a slit.

Next, the shape of the position displacement detection toner mark 115 and the shape of the slit 118a formed on the slit plate 118 will be described. FIG. 13 shows the shape of the slit 118a, and FIG. 14 shows the position relation between the slit 118a and the position displacement detection toner mark 115 formed on the transfer carrying belt 22a.

The position displacement detection toner marks 115 are formed on the transfer carrying belt 22a at the positions that will face the sensors 116 as the belt 22a moves. The position displacement detection toner mark 115 includes lines extending in the main scanning corresponding direction so as to be in parallel with each other. Hereinafter, a group of these lines is referred to as a stripe mark. The position displacement detection toner mark 115 further includes lines that are obliquely inclined from the lines of the stripe mark and are parallel to each other. Hereinafter, a group of these inclined lines is referred to as an oblique mark. That is, the position displacement detection toner mark 115 includes both the stripe mark and the oblique mark. Each of the stripe mark and the oblique mark includes the line K, the line C, the line M, and the line Y that are formed by black toner, cyan toner, magenta toner, and yellow toner, respectively.

Figure 14:
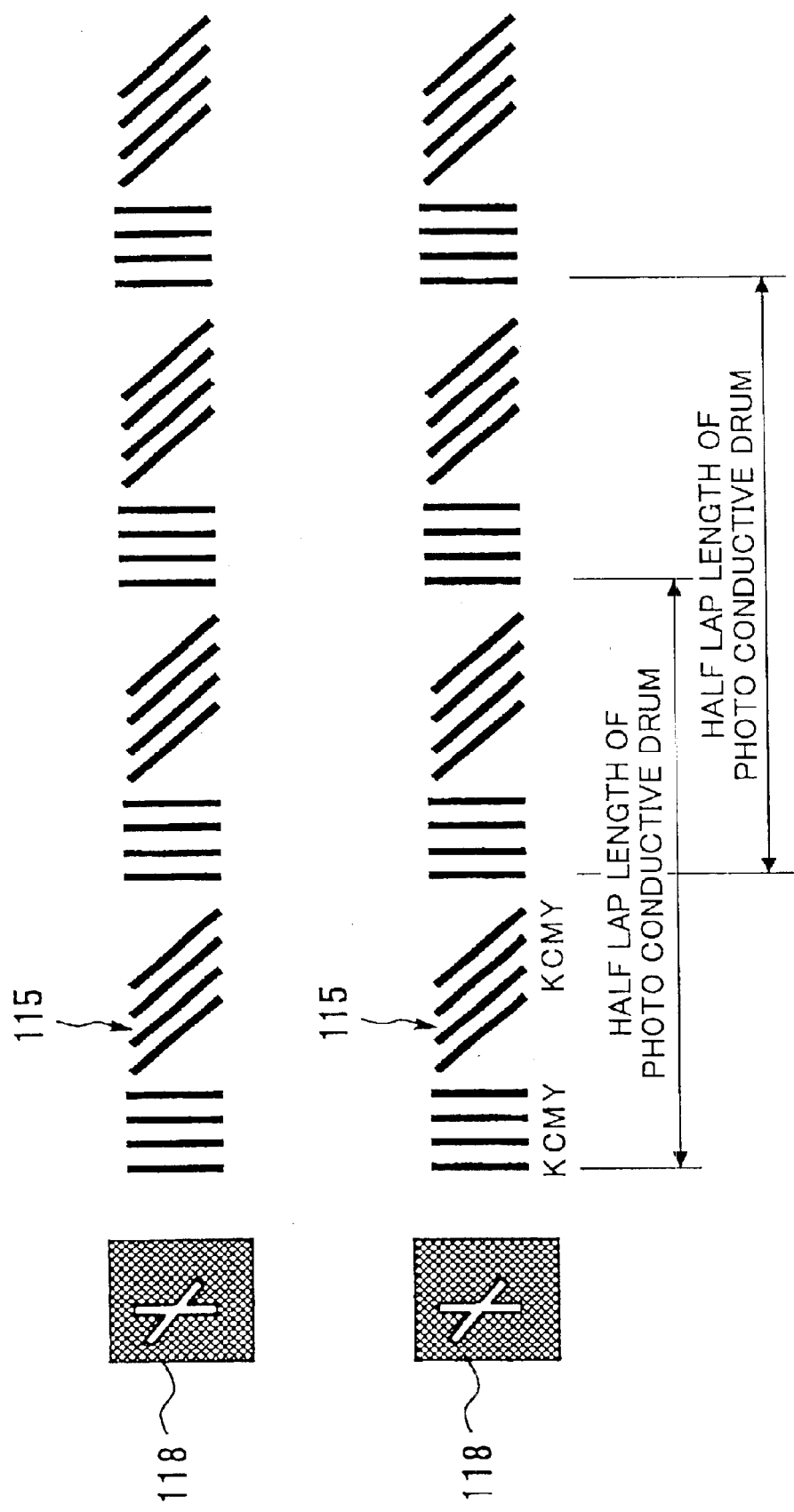
FIG. 14 shows position relation between the slit of FIG. 13 and position displacement detection toner marks formed on a transfer carrying belt.

As shown in FIGS. 13 and 14, the slit 118a includes a first line part formed in the same direction as the stripe mark of the toner mark 115, and a second line part formed in the same direction as the oblique mark of the toner mark 115. The first line part and the second line part together form a cross shape. As shown in FIG. 13, the first line part and the second line part each have the width "a" and the length "b". Each line of the toner mark 115 has the width equal to the width "a" of the slit 118a, and the length larger than the length "b" of the slit 118a. As the transfer carrying belt 22a moves in the sub-scanning corresponding direction, the respective position displacement detection toner marks 115 successively pass the position that faces the slit 118a. When the toner mark 115 does not exist at the position that faces the slit 118a, the light receiving element 119 receives the light from the light emitting element 117 via the transfer carrying belt 22a without being affected by the toner mark 115. When the toner mark 115 exists at the position that faces the slit 118a, the light receiving element 119 receives the light signal from the light emitting element 117 that is shielded by the toner mark 115.

Figure 1A:
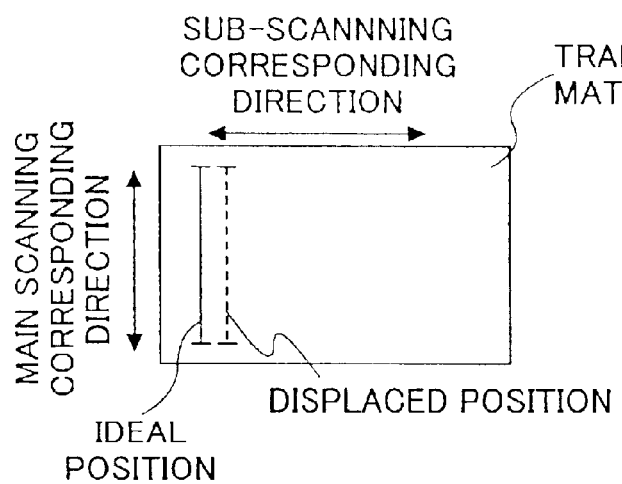
FIGS. 1A through 1F are illustrations showing images that are displaced from an ideal position.
Figure 1B:
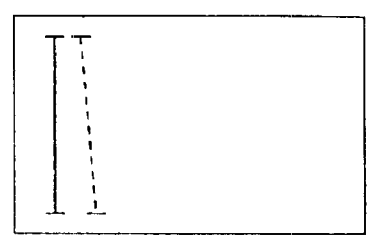
Figure 1C:
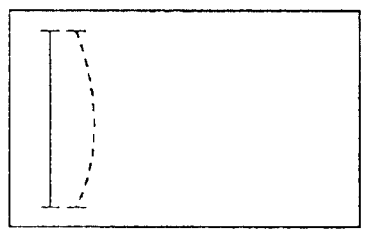

An output signal of the light receiving element 119 is processed by a signal processing unit 120 in time series. In this manner, it is possible to detect the timing at which the toner mark 115 passes the position that faces the slit 118a. Accordingly, it is possible to detect the intervals between the respective color lines K, C, M and Y of the toner mark 115 formed on the transfer carrying belt 22a. Furthermore, based on the stripe mark detection signal detected by the light receiving element, it is possible to detect the image forming position displacement in the sub-scanning corresponding direction such as the position displacement shown in FIG. 1A. In addition, the two stripe marks that are formed on the same main scanning line are combined to detect the scanning line inclination in the sub-scanning corresponding direction such as the position displacement shown in FIG. 1B. Further, based on the oblique mark detection signal detected by the light receiving element, it is possible to detect the image forming position displacement in the main scanning corresponding direction such as the position displacement shown in FIG. 1D, and the magnification displacement in the main scanning corresponding direction such as the position characteristics shown in FIG. 1E. Then, based on the detection result, the signal processing unit 120 performs the signal processing to adjust the detected position displacement. For example, when the scanning line inclination adjusting mechanism includes the actuator, the inclination displacement of the scanning line in the sub-scanning corresponding direction such as the position characteristics shown in FIG. 1B is adjusted by driving the actuator by a necessary amount in accordance with the signal processing result of the signal processing unit 120.

Figure 15:
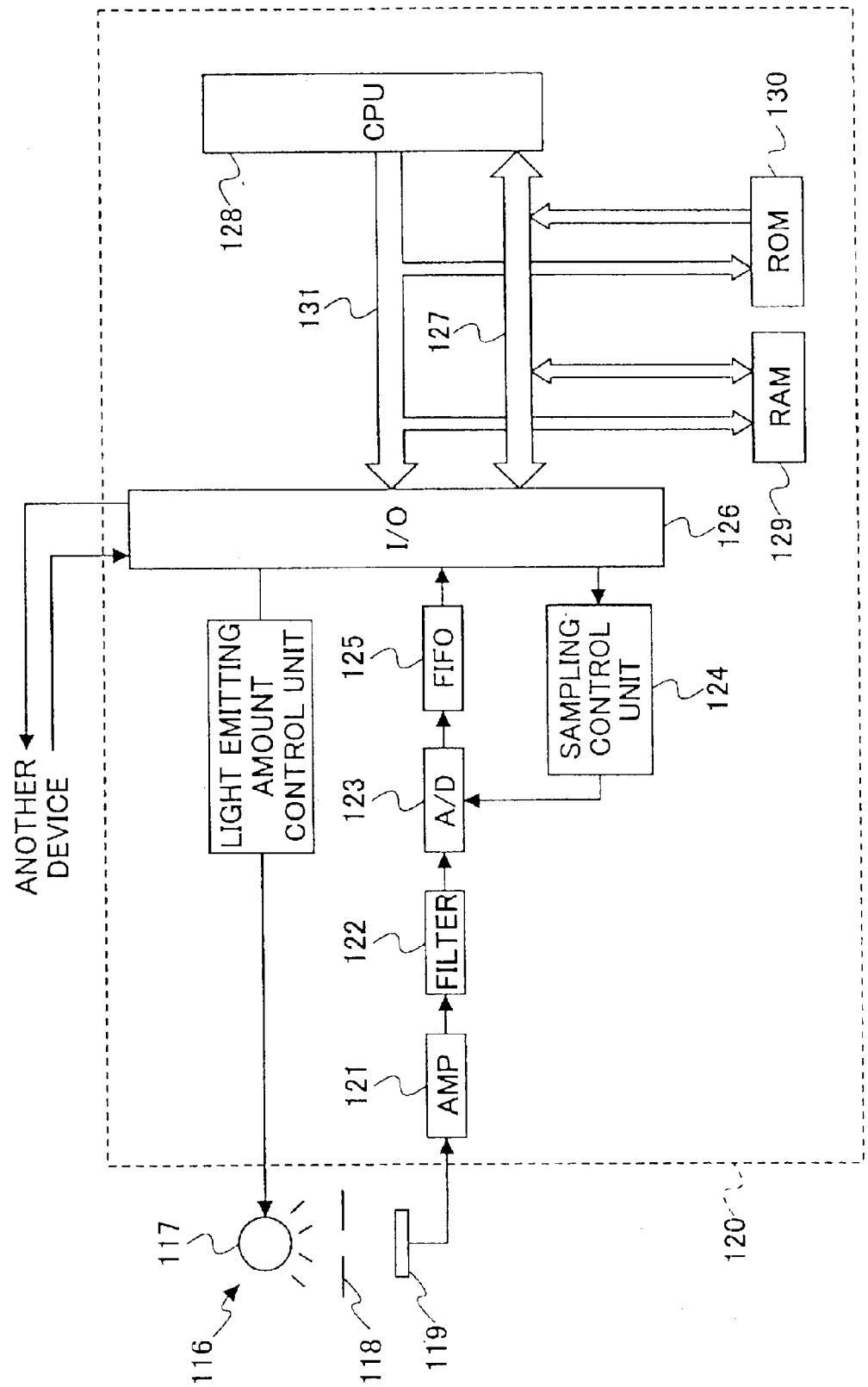
FIG. 15 shows the configuration of a signal processing unit.

Next, the configuration of the signal processing unit 120 will be described in detail. FIG. 15 shows the configuration of the signal processing unit 120. The detection signal obtained from the light receiving element 119 is amplified by an AMP 121, and only the signal component corresponding to the position displacement detection toner mark 115 passes through a filter 122. Then, analog data of the signal that passes through the filter 122 is converted into digital data by an A/D converter 123. Data sampling is controlled by a sampling control unit 124, and the sampled data is stored in an FIFO memory 125. After such a detection process of the position displacement detection toner mark 115 is performed once through, the data stored in the FIFO memory 125 is loaded to a CPU 128 and a RAM 129 via an I/O port 126 by using a data bus 127. Thereby, the CPU 128 performs an arithmetic operation so as to obtain various displacement amounts. Further, an arithmetic operation to remove the displacement amounts is performed, and the result of the arithmetic operation is stored in the RAM 129 so that image forming can be controlled based on this result of the arithmetic operation.

A ROM 130 stores various programs such as a program for performing the arithmetic operation to obtain the displacement amounts. An address bus 131 specifies a ROM address, a RAM address, and various input/output devices. At an appropriate timing, the CPU 128 monitors the detection signal obtained from the light receiving element 119, and controls a light emitting amount of the light source element 117 so that the received signal sent from the light receiving element 119 to the signal processing unit can maintain the same level at all times even when the quality (transparency) of the transfer carrying belt 22a and the performance of the light emitting element 117 decline. In this manner, the signal sent from the light receiving element 119 to the signal processing unit 120 can be surely detected.

Figure 16:
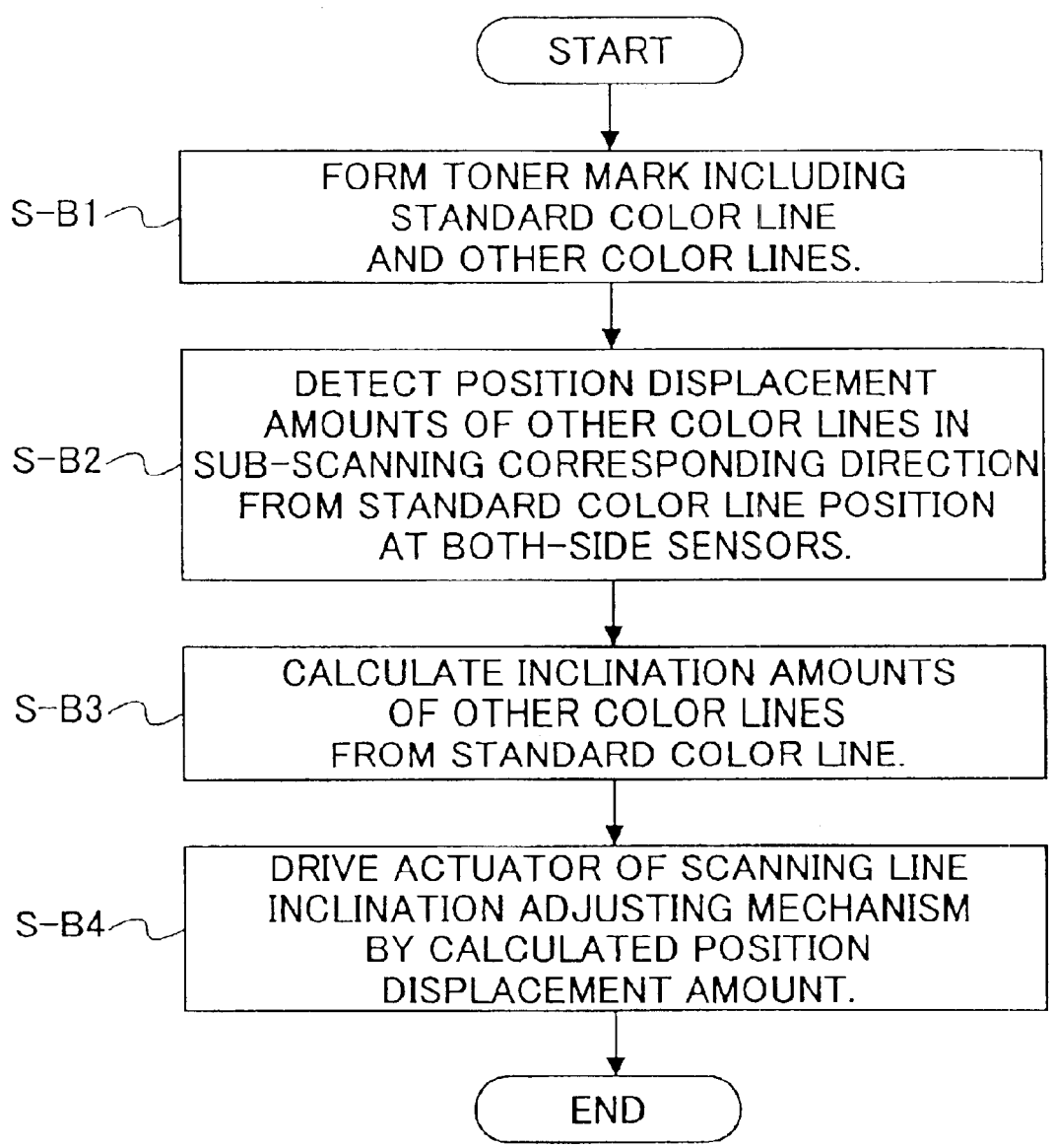
FIG. 16 is a flow chart showing a process of adjusting color change caused by scanning line inclination in a sub-scanning corresponding direction.

Next, a procedure for adjusting position displacement of an toner image will be described in detail. FIG. 16 is a flow chart showing a process of adjusting color change caused by the scanning line inclination in the sub-scanning corresponding direction such as the position characteristics shown in FIG. 1B. When the adjustment process starts, in Step S-B1, the position displacement detection toner marks 115 each including a standard color-line and other color lines (such as the lines K, C, M and Y of FIG. 14) are formed at the respective positions that will face the sensors 116 as the transfer carrying belt 22a moves in the sub-scanning direction. As described above, the toner marks 115 are formed on the transfer carrying belt 22a at the both end sides of the main scanning corresponding direction. Next, in Step S-B2, the sensors 116 detect the toner marks 115. The amounts of the position displacements of the other color lines compared with the standard color line with respect to the sub-scanning corresponding direction are detected based on the detection results obtained by the respective sensors 116 arranged at the both sides along the main scanning corresponding direction. That is, the position displacement amounts of the other color lines of the toner mark 115 are determined by using the position of the standard color line as a reference position. In this manner, position displacement detection means that are one of functions of the signal processing unit 120 are realized. Thereafter, in Step S-B3, the amounts of inclinations of the other color lines compared with the standard color line of the toner mark 115 are calculated based on the detected position displacement amounts corresponding to the respective sensors 116 at the both sides. In this manner, arithmetic operation means that are one of functions of the signal processing unit 120 are realized. Further, in Step S-B4, at the time of the image forming, a process of driving the actuator of the scanning line inclination adjusting mechanism by the amount corresponding to the position displacement amount calculated by the arithmetic operation means is performed. In this manner, actuator driving control means that are one of the functions of the signal processing unit 120 are realized.

Figure 1D:
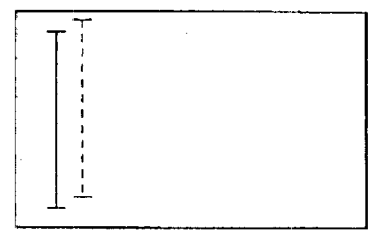
Figure 1E:
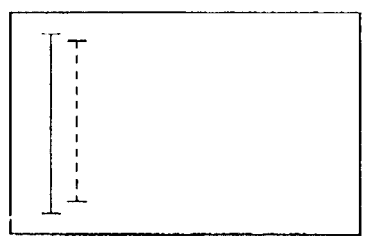
Figure 17:
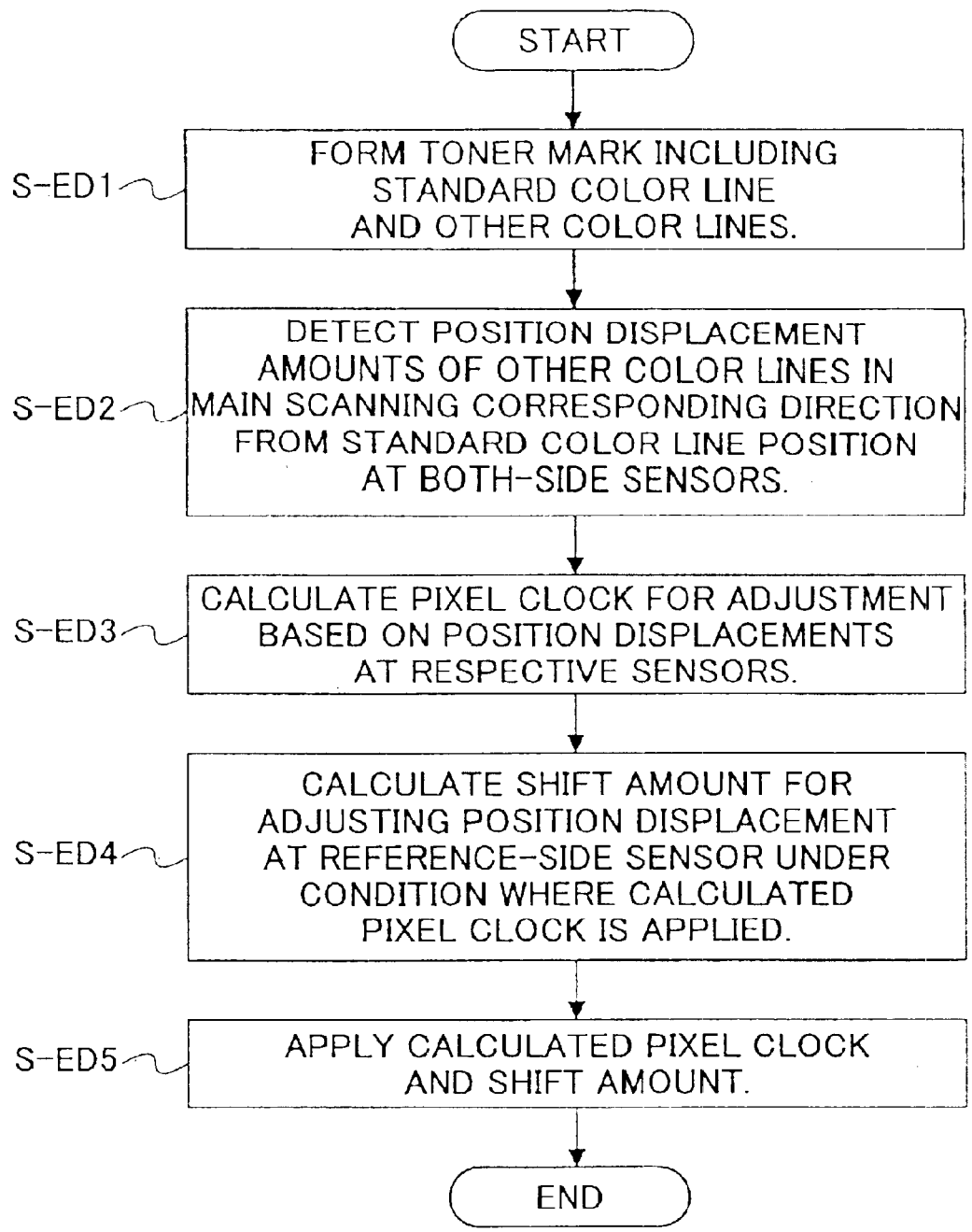
FIG. 17 is a flow chart showing a process of adjusting color change caused by image forming position displacement and magnification difference in the main scanning corresponding direction.

FIG. 17 shows a flow chart of a process of adjusting an image forming position displacement in the main scanning corresponding direction such as the position displacement shown in FIG. 1D, and adjusting a color change caused by the magnification change in the main scanning corresponding direction such as the position characteristics shown in FIG. 1E. When the adjustment process starts, in Step S-ED1, the position displacement detection toner marks 115 including the standard color line and the other color lines are formed at the respective positions that will face the sensors 116 as the transfer carrying belt 22a moves. As described above, the toner marks 115 are formed at the both end sides on the transfer carrying belt 22a in the main scanning corresponding direction. Next, in Step S-ED2, the sensors 116 detect the color lines of the toner mark 115, and the position displacement amounts of the other color lines of the toner mark 115 compared with the standard color line of the toner mark 115 with respect to the main scanning corresponding direction, based on the detection results corresponding to the respective sensors arranged along the main scanning direction. In this manner, position displacement detection means that are one of the functions of the signal processing unit 120 are realized. Thereafter, in Step S-ED3, a pixel clock for adjustment is calculated based on the position displacement amounts detected by the respective sensors 116. Furthermore, a shift amount for adjusting the position displacement in the main scanning corresponding direction under the condition where the adjusted pixel clock for adjusting the magnification change is applied is calculated. In this manner, arithmetic operation means that are one of the functions of the signal processing unit 120 are realized. In Step S-ED4, at the time of the image forming, a process of changing the pixel clock based on the pixel clock calculated by the arithmetic operation means is performed, and a process of shifting an image by the calculated shift amount is also performed. In this manner, pixel clock changing means and image shifting means each of which are one of the functions of the signal processing unit 120 are realized.

Figure 1F:
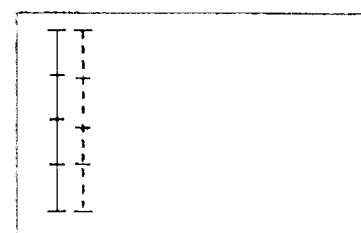

FIG. 18 is a flow chart showing a process of adjusting color change caused by the scanning speed uniformity deviation in the main scanning corresponding direction such as the position characteristics shown in FIG. 1F. When the adjustment process starts, in Step S-F1, the position displacement detection toner marks 115 including the standard color line and the other color lines are formed at the positions on the transfer carrying belt 22a that will face the three sensors 116 (located as shown in FIG. 11), respectively as the transfer carrying belt 22a moves in the main scanning direction. Next, in Step S-F2, the sensors 116 detect the toner mark 116, and the position displacement amounts of the other color lines of the toner marks 115 compared with the standard color line of the toner marks 115 in the main scanning direction, based on the detection results corresponding to the three sensors arranged along the main scanning corresponding direction. In this manner, position displacement amount detection means that are one of the functions of the signal processing unit 120 are realized. Thereafter, based on the position displacement amounts detected by the respective sensors 116, the amount of the scanning speed uniformity deviation of the other colors from the scanning speed uniformity of the standard color is calculated in Step S-F3. In this manner, arithmetic operation means that are one of the functions of the signal processing unit 120 are realized. Next, in Step S-F4, at the time of the image forming, a process of driving the actuator of the scanning speed uniformity adjusting mechanism by the amount of the scanning speed uniformity deviation calculated by the arithmetic operation means is performed. In this manner, actuator driving control means that are one of the functions of the signal processing unit 120 are realized.

According to this embodiment of the present invention, as one example, the three sensors 116 are arranged along the main scanning corresponding direction. However, the number of the sensors 116 that are arranged along the main scanning corresponding direction may be increased so as to detect the area where the scanning speed uniformity deviation is largest (i.e., the area where the unevenness of the scanning speed is largest) and so as to detect the amount of the largest scanning speed uniformity deviation. Furthermore, for example, the processes of the flow chart shown in FIG. 18 may be repeated to compare the currently adjusted result with the previously adjusted result regarding the scanning speed uniformity. Thereby, it is possible to adjust the scanning speed uniformity deviation with higher accuracy.

Furthermore, according to this embodiment of the present invention, as one example, the position adjustment is performed by using the position of the standard color line of the toner mark as a reference position. However, the position of the standard color line of the toner mark may be adjusted by using absolute position data as a reference position. Thereby, it is possible to perform the absolute position adjustment with high accuracy. Particularly, in the case of the plotter that requires high position accuracy, it is preferable to perform the absolute position adjustment.

Meanwhile, in the case of the apparatus that does not require the high absolute position accuracy, the following structure may be employed.

According to another embodiment of the present invention, in the case of the light scanning device 5 (as shown in FIG. 2) that emits the light beams L1, L2, L3 and L4 for the four respective photoconductive bodies arranged in parallel, when the standard optical path corresponds to a black color, the scanning speed uniformity adjusting mechanism and the scanning line inclination adjusting mechanism are not provided at the black color optical path. In this case, the adjustment is not performed for the purpose of bringing the position displacement into an ideal absolute position state, but is performed to bring the scanning speed uniformity and the scanning line inclination into the state of the black color optical path. In this structure of the image forming apparatus, the absolute position accuracy of a formed image may be on the order of several hundred microns. According to this structure, in the case of the color image forming apparatus, the position displacements of the respective color scanning lines can be adjusted to zero relative to each other, so that the quality of the color image is not degraded.

In the above-described adjustment methods, it is preferable to perform the scanning line inclination adjustment after the scanning speed uniformity adjustment is performed. In a certain case, if the scanning speed uniformity adjustment is performed after the scanning line inclination adjustment, the scanning line is inclined again by the scanning speed uniformity adjustment. Accordingly, in this case, it is necessary to perform the scanning line inclination adjustment again, and the adjustment convergence is deteriorated. Furthermore, by performing the scanning line inclination adjustment, the magnification difference and the image forming position displacement occur. Accordingly, the adjustment process is preferably performed in the order of the scanning speed uniformity adjustment, the scanning line inclination adjustment, the magnification difference/ image forming position displacement adjustment to complete the adjustment in a short amount of time.

This patent application is based on Japanese priority patent application No. 2002-144725 filed on May 20, 2002, the entire contents of which are hereby incorporated by reference.

What is claimed is:

1. A light scanning device comprising:
    at least one reflection mirror;
    an optical element having a function of adjusting a scanning line with respect to a sub-scanning corresponding direction;
    a scanning speed uniformity adjusting mechanism that moves the reflection mirror around a first axis that is orthogonal to a main scanning corresponding direction and parallel to a reflection surface of the reflection mirror; and
    a scanning line inclination adjusting mechanism that moves the optical element around a second axis that is orthogonal to the main scanning corresponding direction and orthogonal to the sub-scanning corresponding direction.

2. The light scanning device according to claim 1, wherein one end part of the reflection mirror is fixed, the scanning speed uniformity adjusting mechanism comprises a lead screw provided at the other end part of the reflection mirror wherein rotating the lead screw causes the reflection mirror to be moved around the first axis.

3. The light scanning device according to claim 1, wherein one end part of the optical element is fixed, and the scanning line inclination adjusting mechanism comprises a lead screw provided at the other end part of the optical element, wherein rotating the lead screw causes the optical element to be moved around the second axis.

4. The light scanning device according to claim 2, wherein the scanning speed uniformity adjusting mechanism further comprises an electrically controllable actuator that rotates the lead screw.

5. The light scanning device according to 3, wherein the scanning line inclination adjusting mechanism further comprises an electrically controllable actuator that rotates the lead screw.

6. The light scanning device according to claim 2, wherein the scanning speed uniformity adjusting mechanism further comprises a knob that is rotated for rotating the lead screw.

7. The light scanning device according to claim 3, wherein the scanning line inclination adjusting mechanism further comprises a knob that is rotated for rotating the lead screw.

8. The light scanning device according to claim 1, wherein the optical element comprises a toroidal lens.

9. The light scanning device according to claim 2, wherein the scanning speed uniformity adjusting mechanism further comprises a leaf spring provided at an opposite side of the reflection mirror with respect to the lead screw.

10. The light scanning device according to claim 3, wherein the scanning line inclination adjusting mechanism further comprises a leaf spring provided at an opposite side of the optical element with respect to the lead screw.

11. An image forming apparatus comprising:
a latent image holding body;
charging means for charging a surface of the latent image holding body uniformly;
a light scanning device that forms a latent image on the surface of the latent image holding body;
developing means for developing the latent image into a visible image by using a developing agent;
wherein the light scanning device comprises:
at least one reflection mirror;
an optical element having a function of adjusting a scanning line with respect to a sub-scanning corresponding direction;
a scanning speed uniformity adjusting mechanism that moves the reflection mirror around a first axis that is orthogonal to a main scanning corresponding direction and parallel to a reflection surface of the reflection mirror; and
a scanning line inclination adjusting mechanism that moves the optical element around a second axis that is orthogonal to the main scanning corresponding direction and orthogonal to the sub-scanning corresponding direction.

12. The image forming apparatus according to claim 11, wherein at least one of the scanning speed uniformity adjusting mechanism and the scanning line inclination adjusting mechanism has an operation unit that enables the scanning speed uniformity adjusting mechanism or/and the scanning line inclination adjusting mechanism to be operated from outside the image forming apparatus.

13. The image forming apparatus according to claim 12, wherein the operation unit comprises a closing member that prevents the operation unit from being operated.

14. The image forming apparatus according to claim 11, wherein at least one of the scanning speed uniformity adjusting mechanism and the scanning line inclination adjusting mechanism comprises an electrically controllable actuator.

15. The image forming apparatus according to claim 14, further comprising a transfer carrying belt that carries a transferred material to a transfer position where the visible image is transferred to the transferred material,
wherein the transfer carrying belt comprises at least two position detection sensors that are arranged along the main scanning corresponding direction and that detect a position of the visible image on the transfer carrying belt with respect to the main scanning corresponding direction and the sub-scanning corresponding direction and the image forming apparatus has a configuration of driving the actuator of the scanning speed uniformity adjusting mechanism or/and the scanning line inclination adjusting mechanism, based on information obtained by the position detection sensors.

16. The image forming apparatus according to claim 14, further comprising a middle transfer body to which the visible image on the latent image holding body is transferred and that holds the visible image transferred thereto,
wherein the middle transfer body comprises at least two position detection sensors that are arranged along the main scanning corresponding direction and that detect a position of the visible image on the middle transfer body with respect to the main scanning corresponding direction and the sub-scanning corresponding direction and the image forming apparatus has a configuration of driving the actuator of the scanning speed uniformity adjusting mechanism or/and the scanning line inclination adjusting mechanism, based on information obtained by the position detection sensors.

17. An image forming apparatus comprising:
N (N is an integer equal to or more than 2) latent image holding bodies;
charging means for charging surfaces of the N latent image holding bodies uniformly;
a light scanning device that forms latent images on the charged surfaces of the N latent image holding bodies, respectively,
developing means for developing the respective latent images into visible images by using different color developing agents, respectively;
wherein the light scanning device comprises:
N light beam optical paths,
N reflection mirrors provided at the N light beam optical paths, respectively; and
N optical elements provided at the N light beam optical paths, respectively,
and at least one of:
a scanning speed uniformity adjusting mechanism that moves the reflection mirror around a first axis that is orthogonal to the main scanning corresponding direction and parallel to a reflection surface of the reflection mirror; and
a scanning line inclination adjusting mechanism that moves the optical element around a second axis that is orthogonal to the main scanning corresponding direction and orthogonal to the sub-scanning corresponding direction such that the optical element adjusts a position of a scanning line with respect to the sub-scanning corresponding direction;
is provided at each of the (N−1) light beam optical paths.

18. The image forming apparatus according to claim 17, wherein after the scanning speed uniform adjusting mechanism adjusts scanning speed uniformity, the scanning line inclination adjusting mechanism adjusts scanning line inclination.

19. A light scanning device comprising:
at least one reflection mirror;
an optical element having a function of adjusting a scanning line with respect to a sub-scanning corresponding direction;
scanning speed uniformity adjusting means for moving the reflection mirror around a first axis that is orthogonal to a main scanning corresponding direction and parallel to a reflection surface of the reflection mirror; and
scanning line inclination adjusting means for moving the optical element around a second axis that is orthogonal to the main scanning corresponding direction and orthogonal to the sub-scanning corresponding direction.

20. An image forming apparatus comprising:
latent image holding means for holding a latent image;
charging means for charging a surface of the latent image holding means uniformly;
a light scanning device for forming a latent image on the surface of the latent image holding means;

developing mean for developing the latent image into a visible image by using a developing agent;

wherein the light scanning device comprises:

at least one reflection mirror;

an optical element having a function of adjusting a scanning line with respect to a sub-scanning corresponding direction;

scanning speed uniformity adjusting means for moving the reflection mirror around a first axis that is orthogonal to a main scanning corresponding direction and parallel to a reflection surface of the reflection mirror; and scanning line inclination adjusting means for moving the optical element around a second axis that is orthogonal to the main scanning corresponding direction and orthogonal to the sub-scanning corresponding direction.

21. An image forming apparatus comprising:

N (N is an integer equal to or more than 2) latent image holding means for holding a latent image;

charging means for charging surfaces of the N latent image holding means uniformly;

a light scanning device for forming latent images on the charged surfaces of the N latent image holding means, respectively, developing means for developing the respective latent images into visible images by using different color developing agents, respectively;

wherein the light scanning device comprises:

N light beam optical paths,

N reflection mirrors provided at the N light beam optical paths, respectively; and N optical elements provided at the N light beam optical paths, respectively, and at least one of:

scanning speed uniformity adjusting means for moving the reflection mirror around a first axis that is orthogonal to the main scanning corresponding direction and parallel to a reflection surface of the reflection mirror; and scanning line inclination adjusting means for moving the optical element around a second axis that is orthogonal to the main scanning corresponding direction and orthogonal to the sub-scanning corresponding direction such that the optical element adjusts a position of a scanning line with respect to the sub-scanning corresponding direction;

is provided at each of the (N−1) light beam optical paths.

* * * * *